United States Patent [19]
Satomi et al.

[11] Patent Number: 5,384,783
[45] Date of Patent: Jan. 24, 1995

[54] NETWORK SYSTEM AND LINE SWITCHING METHOD USED THEREIN

[75] Inventors: Shigeki Satomi, Tokyo; Naoki Ono, Kawasaki, both of Japan

[73] Assignee: Hitachi, Ltd., Tokyo, Japan

[21] Appl. No.: 793,102

[22] Filed: Nov. 15, 1991

[30] Foreign Application Priority Data

Nov. 20, 1990 [JP] Japan .................. 2-315613

[51] Int. Cl.⁶ .......................................... G06F 11/20
[52] U.S. Cl. ........................................ 371/9.1; 395/575
[58] Field of Search .................. 371/8.2, 9.1, 11.3; 395/575

[56] References Cited

U.S. PATENT DOCUMENTS

| | | | |
|---|---|---|---|
| 4,133,027 | 1/1979 | Hogan | 364/119 |
| 4,751,702 | 6/1988 | Beier et al. | 371/9.1 |
| 4,975,838 | 12/1990 | Mizuno et al. | 395/575 |
| 5,121,486 | 6/1992 | Kurihara et al. | 395/325 |

FOREIGN PATENT DOCUMENTS 62-57337  3/1987  Japan .
260337  2/1990  Japan .

Primary Examiner—Charles E. Atkinson
Attorney, Agent, or Firm—Fay, Sharpe, Beall, Fagan, Minnich & McKee

[57] ABSTRACT

A network system in which a plurality of computers and a terminal device are connected to one another through a node by telecommunication lines, and one computer is designated by the terminal device to communicate data with the terminal device through the node, the node detects a stop or fault of the one computer, or a stop or fault of the telecommunication line connecting the one computer and the node to each other, in response to an incoming call for the one computer from the terminal device, and informs the terminal device of the stop or fault, in response to the detection of the stop or fault. The terminal device changes an address of the designated computer to perform the communication from an address of the one computer to an address of another computer, in response to the information of the stop or fault, whereby the terminal device issues a call to the another computer on the basis of the new address through the node, in the case where the one computer is designated as a computer to perform the communication, after the change of the address.

25 Claims, 18 Drawing Sheets

NETWORK SYSTEM AND LINE SWITCHING METHOD USED THEREIN

BACKGROUND OF THE INVENTION

The present invention relates to a network system, and more particularly to a network system which is designed in such a way that in the network system, in which a plurality of computers provided in one or more centers and a terminal device such as a work station or a personal computer are connected to one another through a node by telecommunication lines, on occurrence of a failure or stop in one computer of the center, or a failure or stop in the telecommunication line between the one computer and the node, a computer to be communicated with the terminal device is switched from the one computer to another computer provided in the same center or another center, and a line switching method used therein.

As for the prior art line switching method as described above, for example, there is known a method disclosed in JP-A-2-60337 corresponding to U.S. patent Ser. No. 398171. This method is arranged in such a way that in a network system in which units such as a plurality of terminal devices, host computers and exchanges (hereinafter, each being also referred to as simply "a unit", when applicable) are connected to one another through a line switching devices by telecommunication lines and back up telecommunication lines, and a network organizing center is connected to the line switching device, during a fault of the telecommunication line, an operator performs an operation of line switching indication from the remote network organizing center to each of the line switching devices, and in response to this invention, each of the line switching devices performs the operation of switching over to the back up line.

On the other hand, in JP-A-62-57337, there is disclosed a data transmission system in which, as shown in FIG. 1, a plurality of data transmission units 1021 through 1023 are connected to one another, processors 1001 and 1003 are connected to the data transmission units 1021 and 1023, respectively and an auxiliary processor 1002 is connected to the data transmission unit 1022. In this system, when the indication is given from the processor 1003 to the processor 1001 to perform the data transmission through the data transmission units 1023 and 1021, if a fault occurs in the processor 1001, the data transmission unit 1021 connected to the processor 1001 serves to change an address of the processor to transmit data from an address of the processor 1001 to that of the auxiliary processor 1002. Accordingly, thereafter, whenever the processor 1001 is designated to transmit the data from the processor 1003 to the data transmission unit 1021, that data transmission unit 1021 performs the address modification processing to transmit the data to the auxiliary processor 1002 through the data transmission unit 1022.

SUMMARY OF THE INVENTION

In the above-mentioned JP-A-2-60337, in the case where in the network system, the communication becomes impracticable during the fault or the like of the unit of interest or the telecommunication line, an operator performs the operation of issuing an indication of switching a line in the side of the network organizing center to switch over the line to be used from the telecommunication line of interest to the back up telecommunication line. Thus, there is no consideration about an automatic switching during the fault. Moreover, there is also no consideration about the operation of switching the unit to be used from the unit of interest to a backup unit.

In order to solve the latter out of the above-mentioned problems, for example, in the case where the unit is a host computer, such a procedure may be considered that a plurality of host computers are connected to one another, and during the stop due to the fault in the communication, the scheduled stop (it means that the operation is intentionally, consciously stopped by an operator) or the like (hereinafter, referred as simply "the fault", when applicable), whether or not the fault occurs is inquired by the communication among the host computers to switch over the host computer to be used from the host computer at fault to the back up host computer. However, in this case, there arises problems in that the host computer needs to be provided with a special processing program and also when the number of host computers is increased, the processing therefor becomes complicated.

On the other hand, in the system disclosed in the above-mentioned JP-A-62-57337, after the fault is caused in the processor 1001, the data from the processor 1003 are transmitted to the data transmission unit 1022 and the auxiliary processor 1002 through the data transmission unit 1021 every transmission. Thus, since the data transmission unit 1021 needs to perform the address modification processing every transmission so that the quantity of the load of the data transmission unit is increased and the number of loads of the many lines is increased, the system is poor in efficiency.

It is therefore an object of the present invention to provide a network system which is designed in such a way as to remove the disadvantages of the prior art, and a line switching method used therein.

It is another object of the present invention to provide a network system having a plurality of units connected to one another through telecommunication lines wherein on occurrence of a fault in the unit, the unit at fault can be automatically switched to another unit free from a fault with good efficiency, and a line switching method used therein.

It is still another object of the present invention to provide a network system having a plurality of computers and a terminal device connected to one another through a node by telecommunication lines, data being transmitted from the terminal device to the computer through the node, wherein on occurrence of a stop or failure in the computer, or on occurrence of a stop or failure in the telecommunication line connecting the computer and the node to each other, the computer to be communicated with the terminal device can be automatically switched to another computer with good efficiency, and a line switching method used therein.

It is yet another object of the present invention to provide a network system having a plurality of terminal devices and a computer connected to one another through a node by telecommunication lines, the computer designating one terminal device to transmit data from the computer to the one terminal device through the node, wherein on occurrence of a stop or failure in the one terminal device, or on occurrence of a stop or failure in the telecommunication line connecting the one terminal to the node, the terminal device to be communicated with the computer can be automatically switched to another terminal device with good efficiency, and a line switching method used therein.

According to an aspect of the present invention, in a network system in which a plurality of computers and a terminal device are connected to one another through a node by telecommunication lines, and one computer is designated by the terminal device to transmit data from the terminal device to the one computer through the node, the node is comprised of: a section for detecting a stop or failure of the one computer, or a stop or failure of the telecommunication line connecting the computer and the node to each other, in response to a call out to the one computer; and a section for informing the terminal device of the stop or failure, in response to the detection of the stop or failure.

According to an example of the present invention, the terminal device includes a section for changing an address of the designated computer to perform the communication from an address of the one computer to an address of another computer. Therefore, after the change of the address, the terminal device can automatically issue a call to the another computer instead of the one computer, in the case where the one computer is designated as a computer to form the communication.

Further, according to an example of the present invention, the telecommunication line connecting the node and the one computer to each other are constructed by a plurality of lines, the section for detecting the stop or failure includes a section for inspecting stops or failures of the plurality of lines connecting the one computer and the node to each other in sequence, in response to the call issued from the terminal device to the one computer, and the information section includes a section for informing the terminal device of the stop or failure, in response to the detection of all the stops or failures of the plurality of lines. Furthermore, the node includes a section for performing call setup to said one computer through one line of the plurality of lines when it is judged by the inspection section that the one line is normal.

Therefore, even if one line leading to the one computer is at fault, the call setup can be automatically performed to the one computer through a normal another line.

According to another aspect of the present invention, in a network system in which a plurality of terminal devices and a computer are connected to one another through a node by telecommunication lines, and one terminal device is designated by the computer to transmit data from the computer to the one terminal device through the node, the node is comprised of: a section of detecting a stop or failure of the one terminal, or a stop or failure of the telecommunication line connecting the one terminal device and the node to each other, in response to a call issued from the computer to the one terminal device; and a section for informing the computer of the stop or failure, in response to the detection of the stop or failure.

Further, according to an example of the present invention, in a network system in which a plurality of host computers provided in one or more centers and a terminal device are connected to one another through a node by telecommunication lines, the node is composed of: a section for switching the center or the host computer in the center to another center or another host computer in the another center; and a section for informing the terminal device of the switching by the switching section. As a result, on occurrence of a fault during the communication, or on occurrence of a stop due to a scheduled stop or the like, the center or the host computer in that center is switched to another backup center or another host computer by the switching section, and the terminal device is informed of the switching by the information section.

Therefore, on occurrence of the fault during the communication, or on occurrence of the stop due to the scheduled stop or the like, the center or the host computer in that center is switched to another backup center or another host computer by the switching section, and also the terminal device is informed of the switching by the information section. As a result, without an operator supervision of the terminal device or the center being aware of such an operation, it is possible to automatically perform the switching to the another backup center or the another host computer provided therein, and therefore, it is possible to realize the simplification of the operation.

DESCRIPTION OF THE PREFERRED EMBODIMENTS

Figure 1:
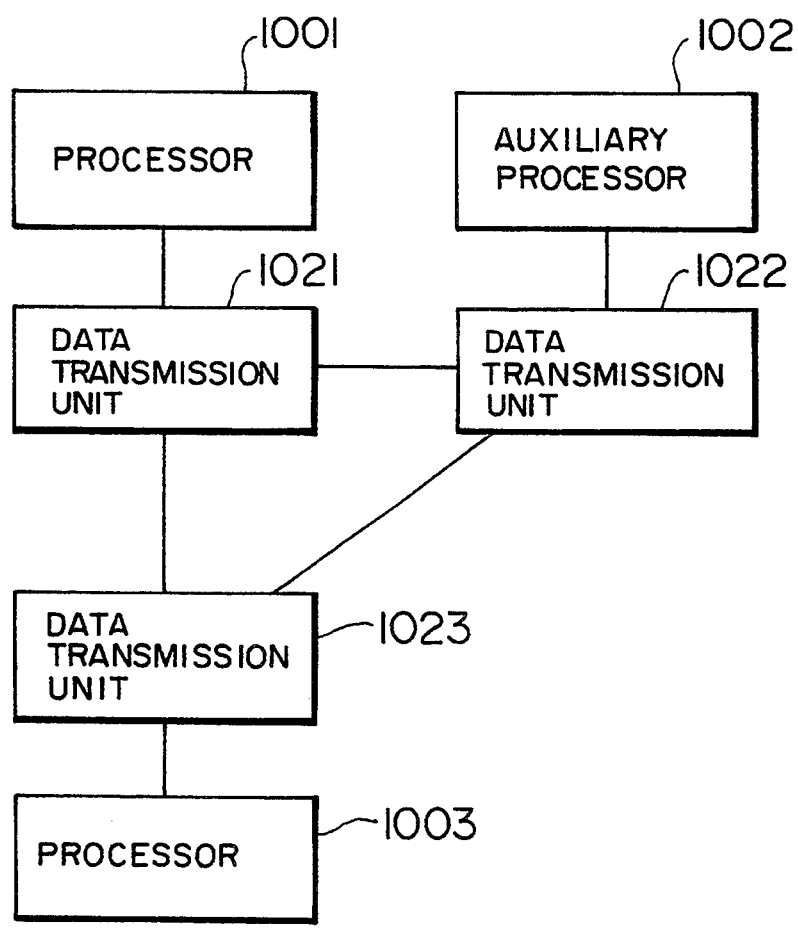
FIG. 1 is a schematic block diagram showing the arrangement of an example of an automatic switching device of the prior art data transmission system.

The preferred embodiments of the present invention will hereinafter be described in detail with reference to the accompanying drawings. In the figures, those parts designated by the same reference numeral have the same function.

Figure 2:
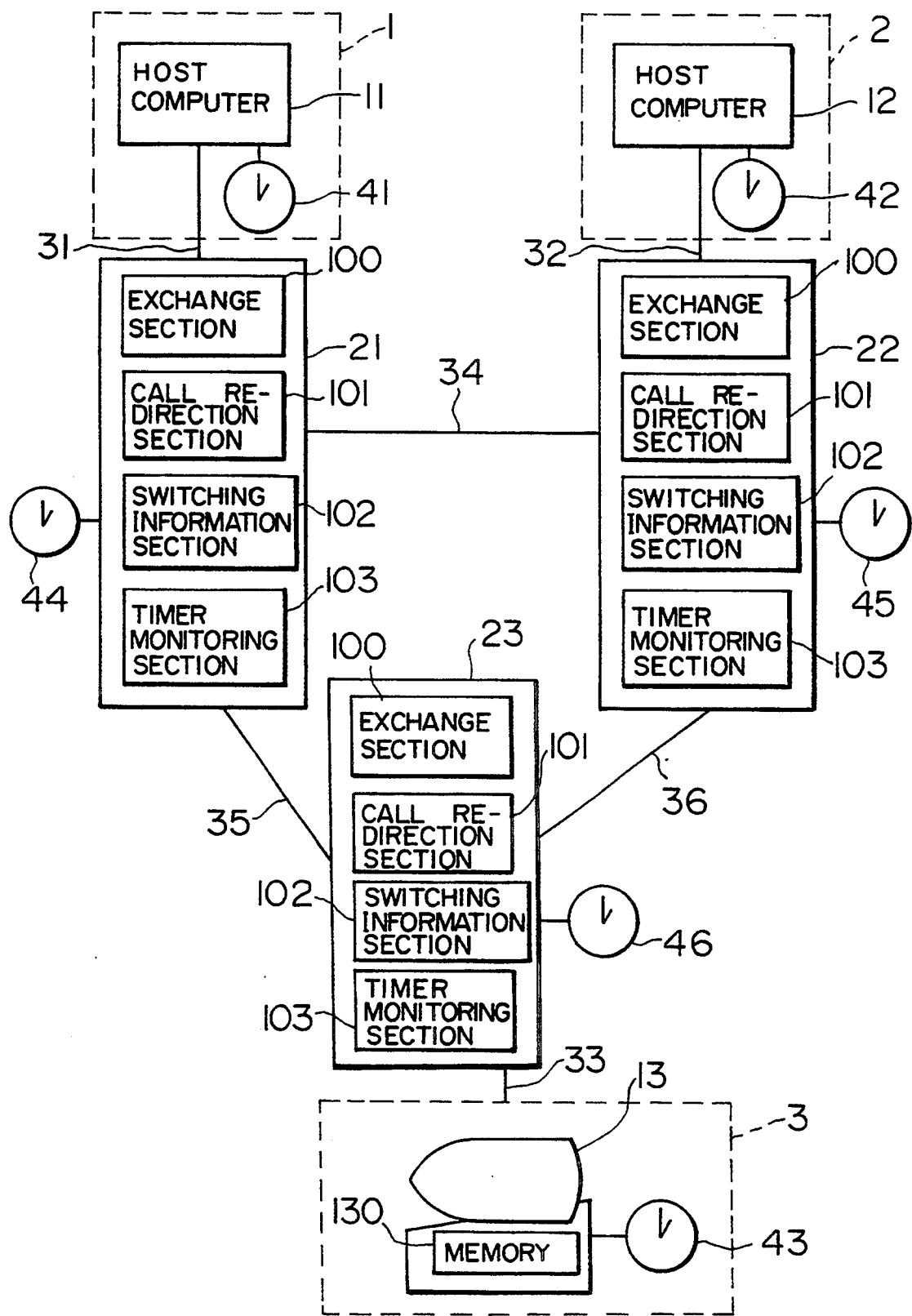
FIG. 2 is a block diagram showing the arrangement of an example of a network system according to the present invention.

FIG. 2 is a block diagram showing the arrangement of a network system according to the first embodiment of the present invention. Referring to FIG. 2, the reference numeral 1 designates an A computer center; 2 a B computer center for backup; 3 a business shop having a terminal device installed therein; 11 a computer, e.g., a host computer in the A computer center 1; 12 a computer, e.g., a host computer in the B computer center 2; 13 a computer as a terminal device, e.g., a work station installed in the business shop; and 21, 22 and 23 exchanges as nodes, e.g., packet exchanges (hereinafter, each being referred to as simply "a node". The reference numeral 31 designates a line connecting the host computer 11 and the node 21 to each other; 32 a line connecting the host computer 12 and the node 22 to each other; 33 a line connecting the work station 13 and the node 23 to each other; 34 a line connecting the node 21 and the node 22 to each other; 35 a line connecting the node 21 and the node 23 to each other; and 36 a line connecting the node 22 and the node 23 to each other.

The reference numeral 130 designates a memory in the work station for storing addresses of the host computers 11 and 12.

Moreover, the reference numeral 41 designates a timer included in the host computer 11; 42 a timer included in the host computer 12; 43 a timer included in the host computer 13; 44 a timer included in the node 21; and 46 timer included in the node 23. Incidentally, each of the nodes 21, 22 and 23 has a normal exchange function, a call redirection function, a switching information function and a timer monitoring function. By the call redirection function, it means such a function that on occurrence of a failure or fault of a center, a host computer provided in the center or a telecommunication line thereof., or on occurrence of a stop due to a scheduled stop or the like, the center or the host computer in that center is automatically switched to another backup center or another host computer provided therein. By the switching information function, it means such a function that a terminal device such as a work station or a personal computer is informed of completion of the switching of the center or the host computer provided therein. Moreover, in the present embodiment, the packet exchange is given as an example of the node. However, the present invention is not limited thereto or thereby. That is, it should be understood that even if the node is constructed by another device such as a local switching system or a distributed computer, there is provided the same effects.

Moreover, by the failure (fault) of the computer, it means a state in which operational services provided by the computer cannot be carried out, and by the stop, it means a state in which such services are stopped.

The outline of the arrangement of the present embodiment will hereinbelow be described on referring to FIG. 2. In the present embodiment, in the normal operation, the work station 13 and the A computer center 1 communicate with each other and in the case of the failure (fault), or the stop such as the scheduled stop including a routine inspection or the like of the A computer center 1 or its host computer 11, or the failure or stop of the telecommunication line 31 (hereinafter, referred to as simply "the failure or stop of the computer 11", the work station 13 and the host computer in the B computer center 2 communicate with each other. The description will hereinbelow be given with respect to the operation of the switching from the A computer center 1 to the B computer center 2 on referring to FIGS. 3A through 3C and FIGS. 4A through 4C. Incidentally, in the present embodiment, each of the above-mentioned nodes 21, 22 and 23 includes: a call redirection section 101 for automatically switching a call issued from the terminal device 3 to the computer 11 to a call for the host computer 12 in the case of the fault or stop of the host computer 11; a switching information section 102 for informing the work station 13 of completion of the switching of the center or the host computer provided therein; a timer monitoring section 103 for monitoring a response at a level of a data link, a response of communication data, call accept, clear confirmation or the like with a timer; and an exchange section 100 having a normal exchange function.

Moreover, in FIGS. 3A through 5C, the numerals 101, 102 and 103 in each of the associated blocks represent the operations of the call redirection section, the switching information section and the timer monitoring section, respectively and each of the blocks having no numeral represents the operation of the exchange section.

Figure 3A:
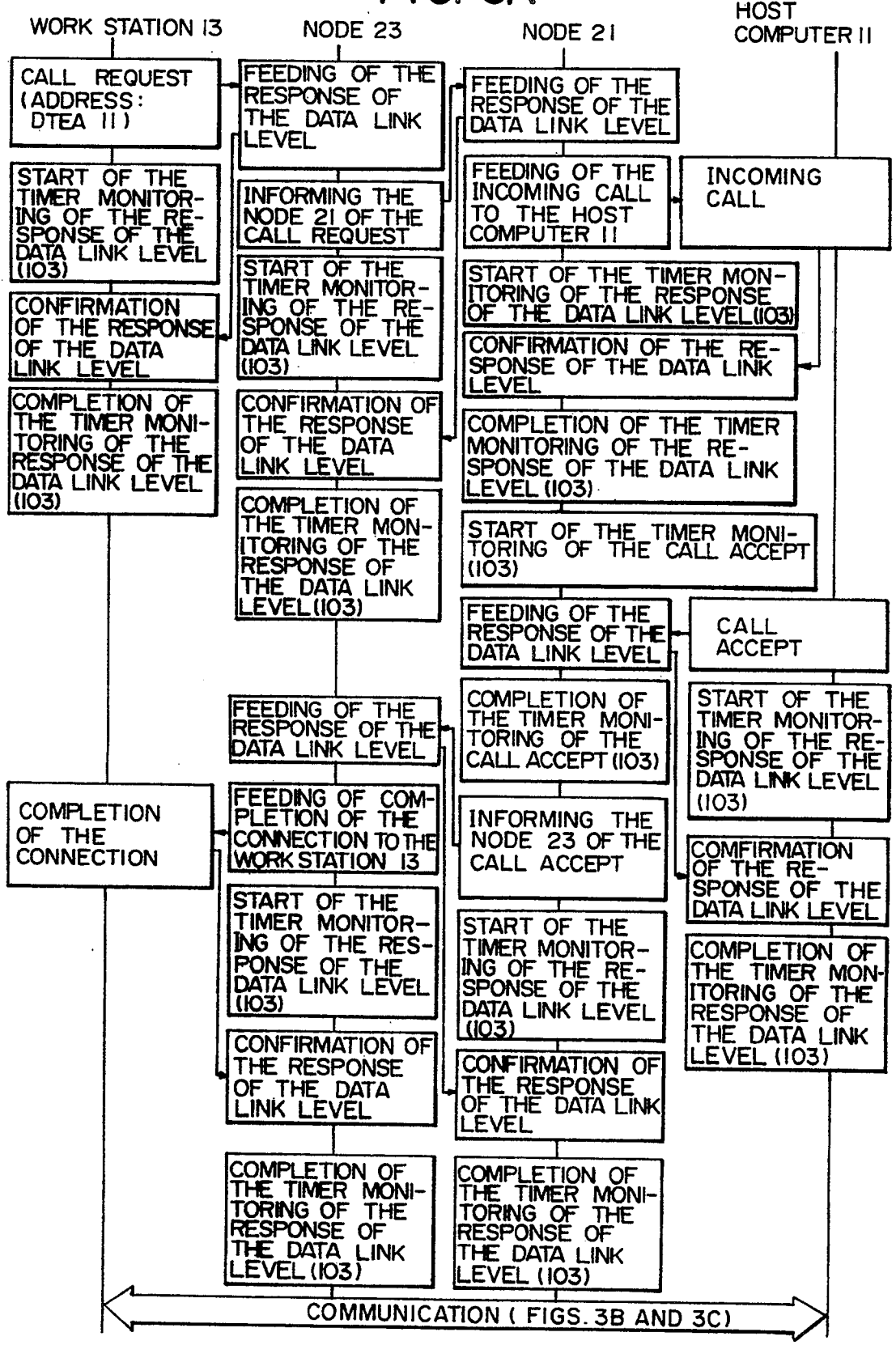
FIGS. 3A through 3D are respectively flow charts useful in explaining call setup, communication and a call releasing operation in the example shown in FIG. 2.
Figure 3B:
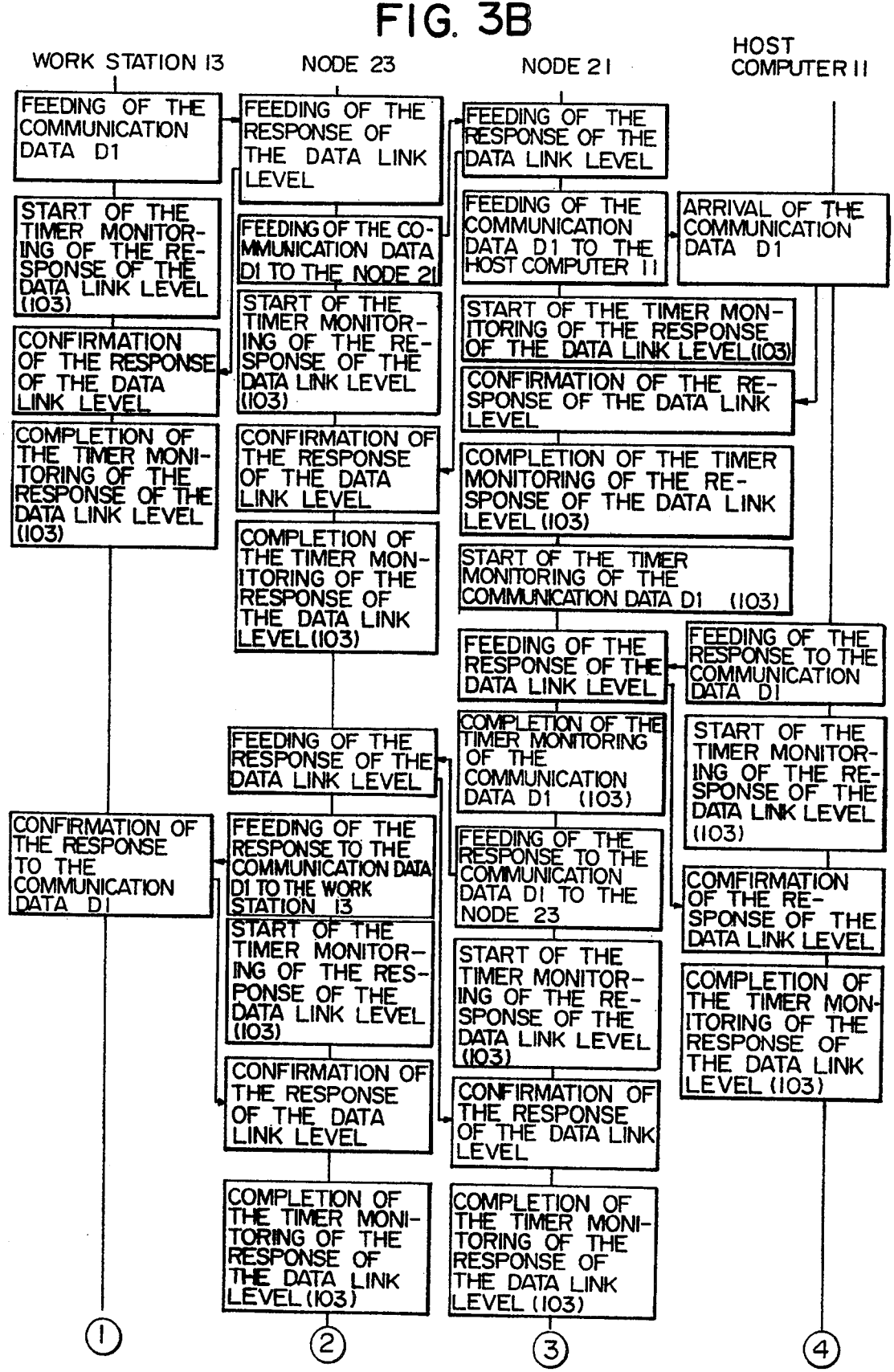
Figure 3C:
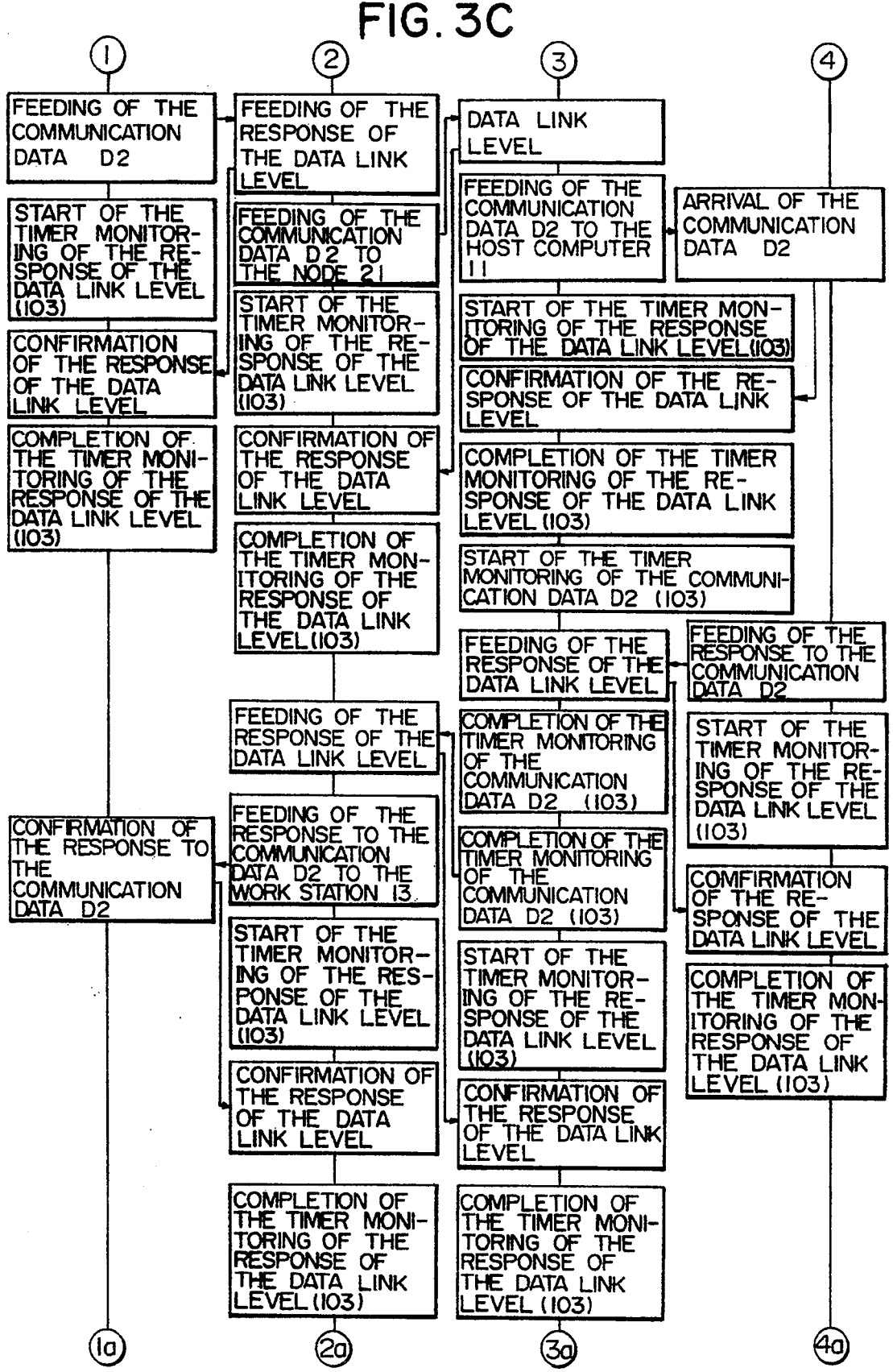
Figure 3D:
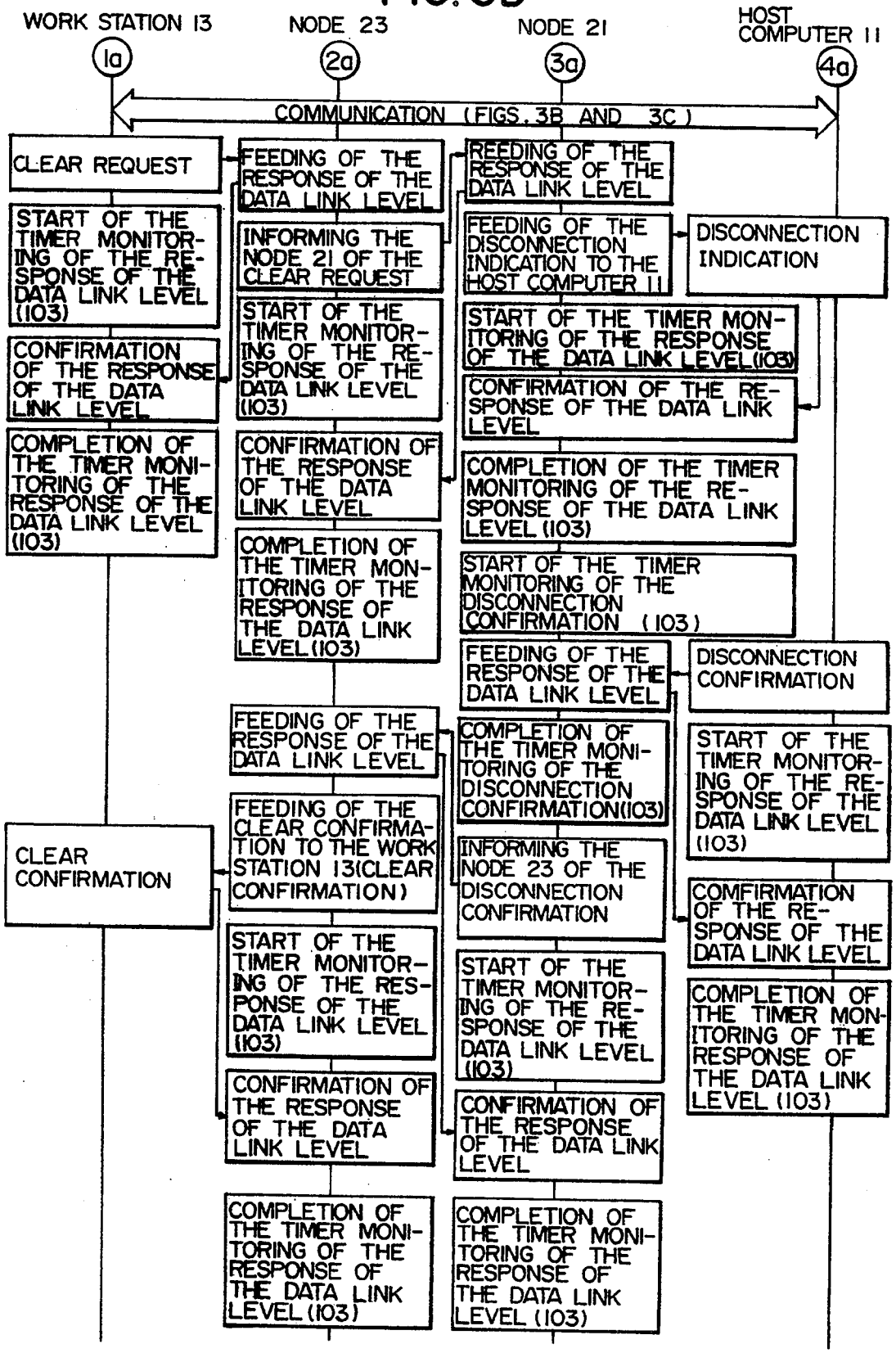
Figure 4A:
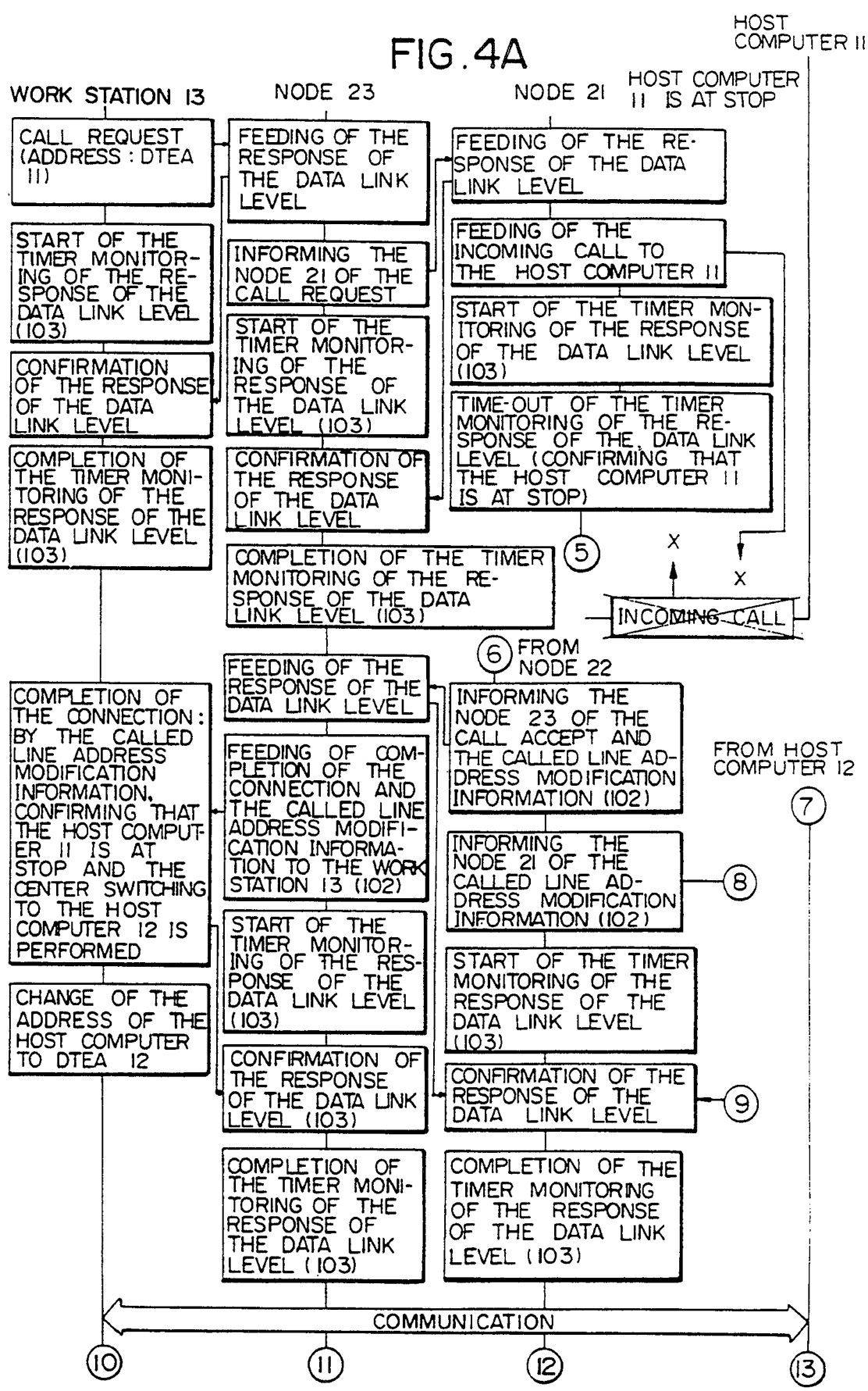
FIGS. 4A through 4C are respectively flow charts useful in explaining an automatic switching operation before the call setup in the example shown in FIG. 2.
Figure 4B:
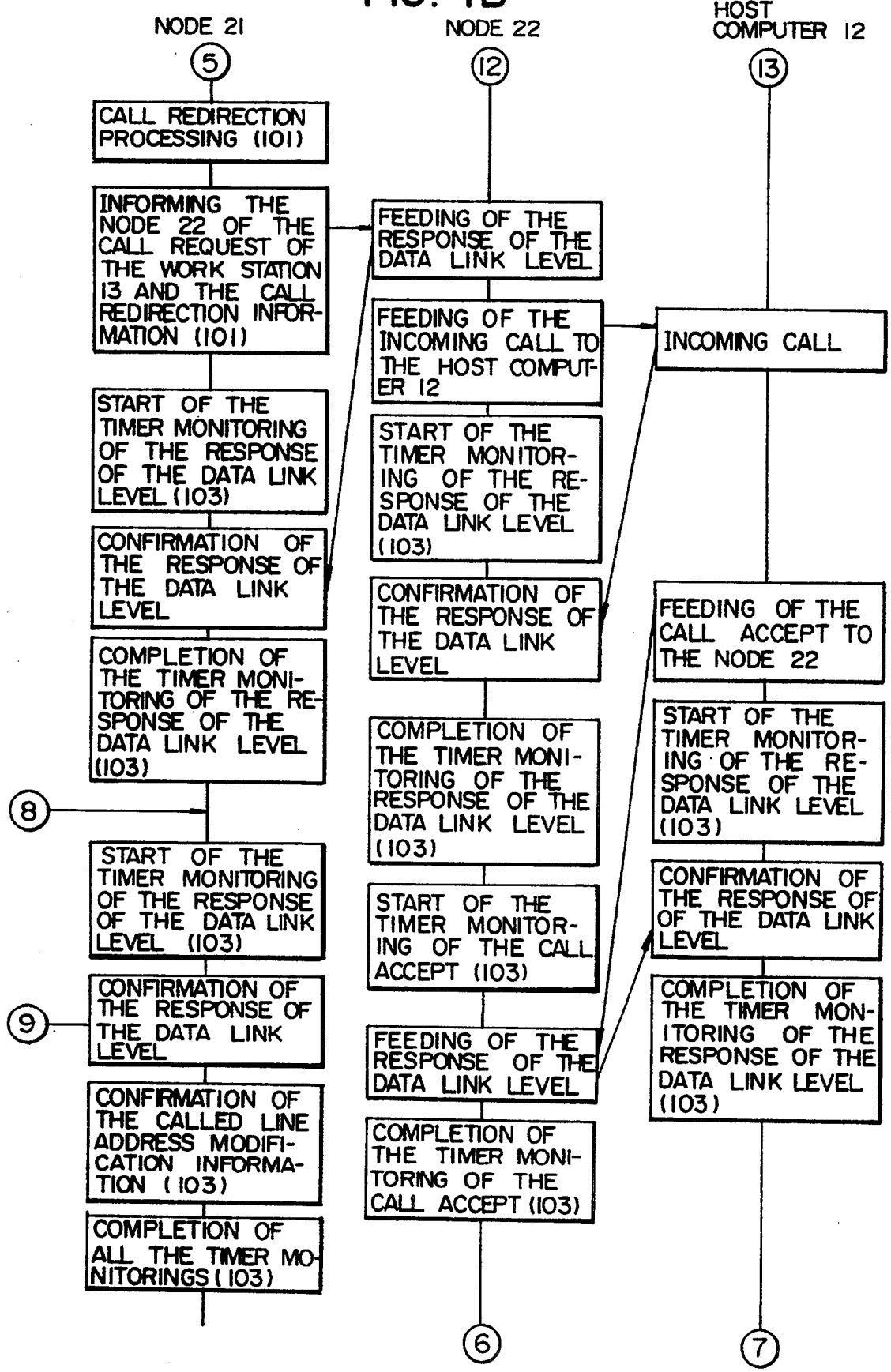
Figure 4C:
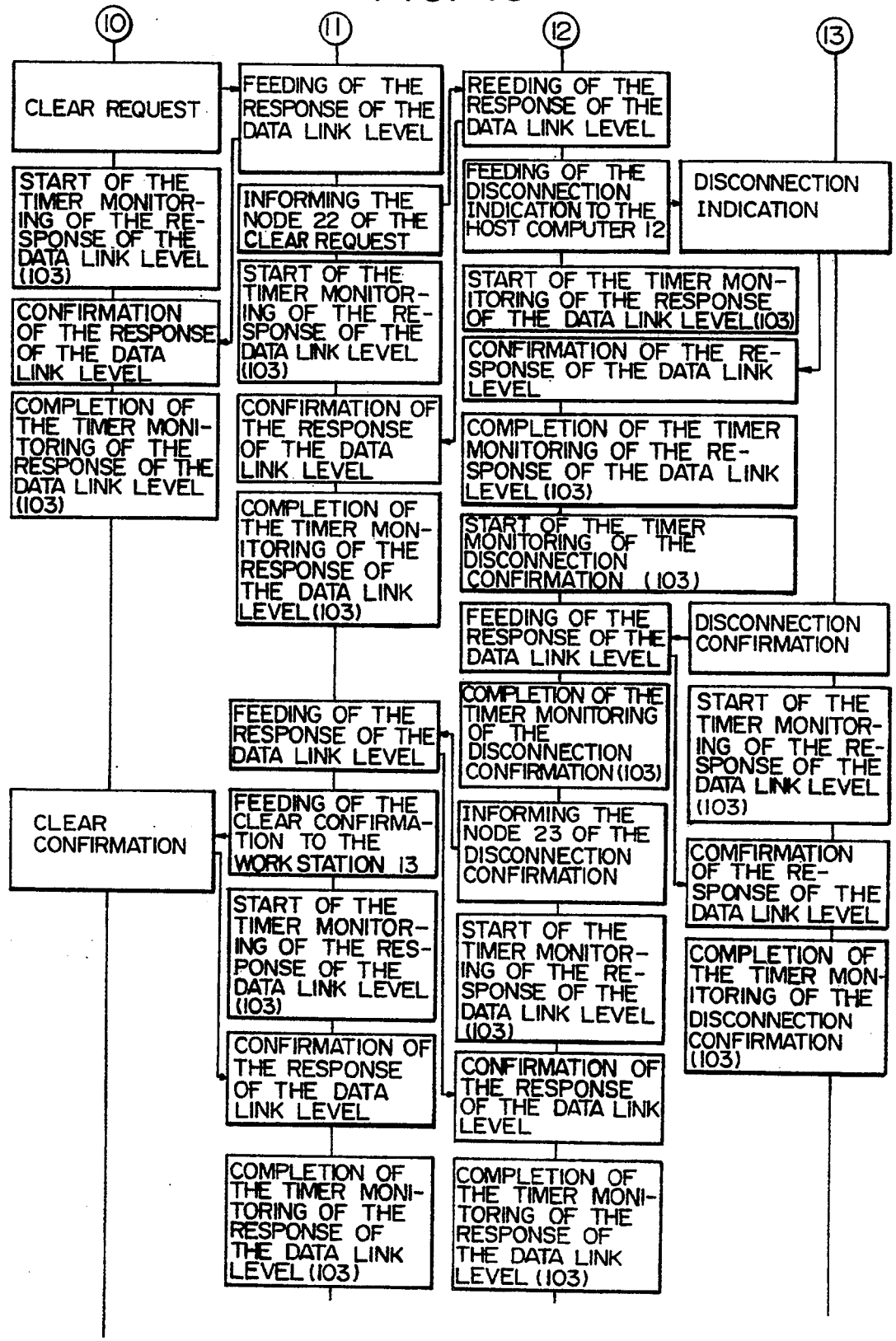
Figure 5A:
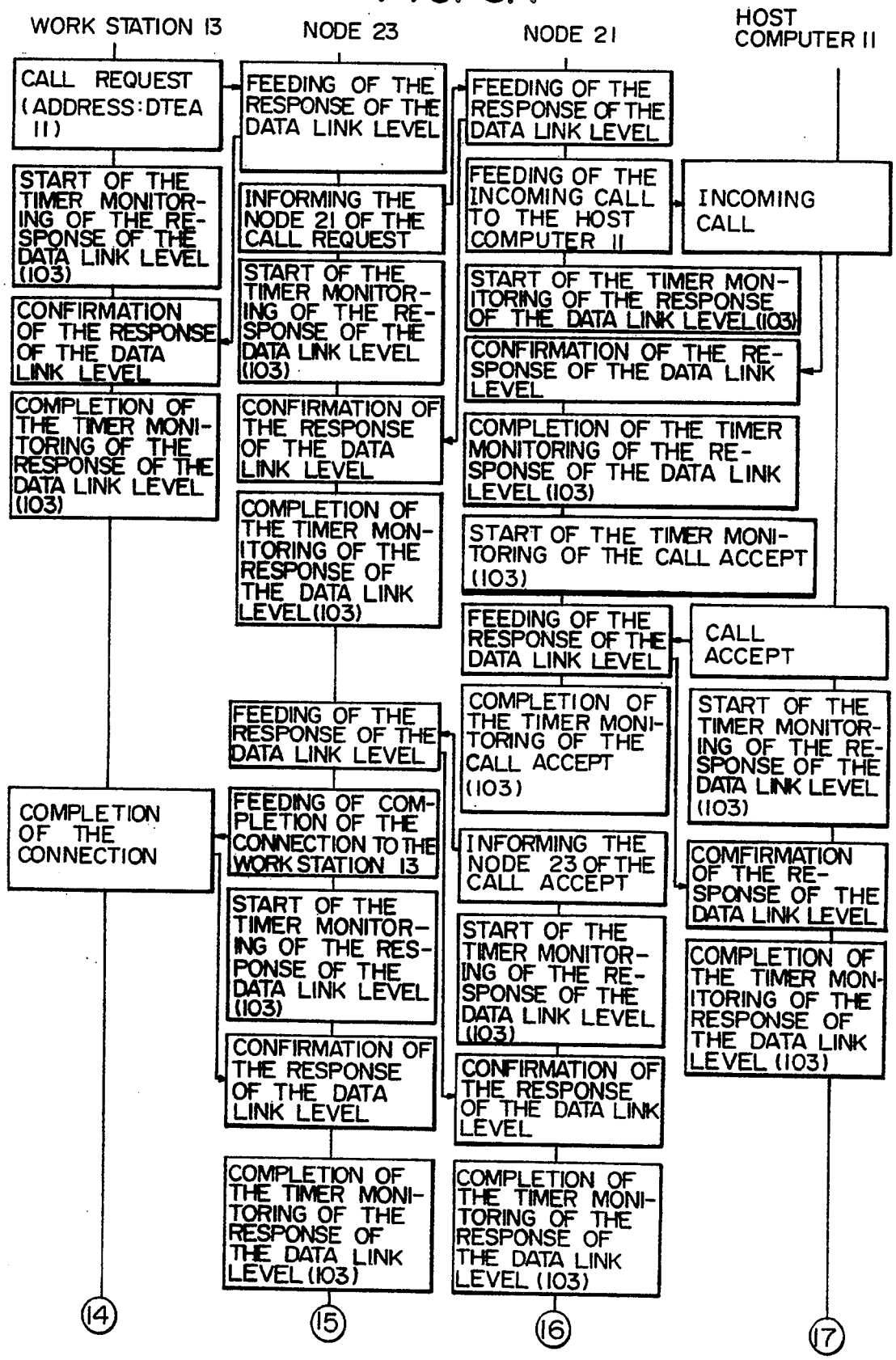
FIGS. 5A through 5C are respectively flow charts useful in explaining an automatic switching operation after the call setup in the example shown in FIG. 2.
Figure 5B:
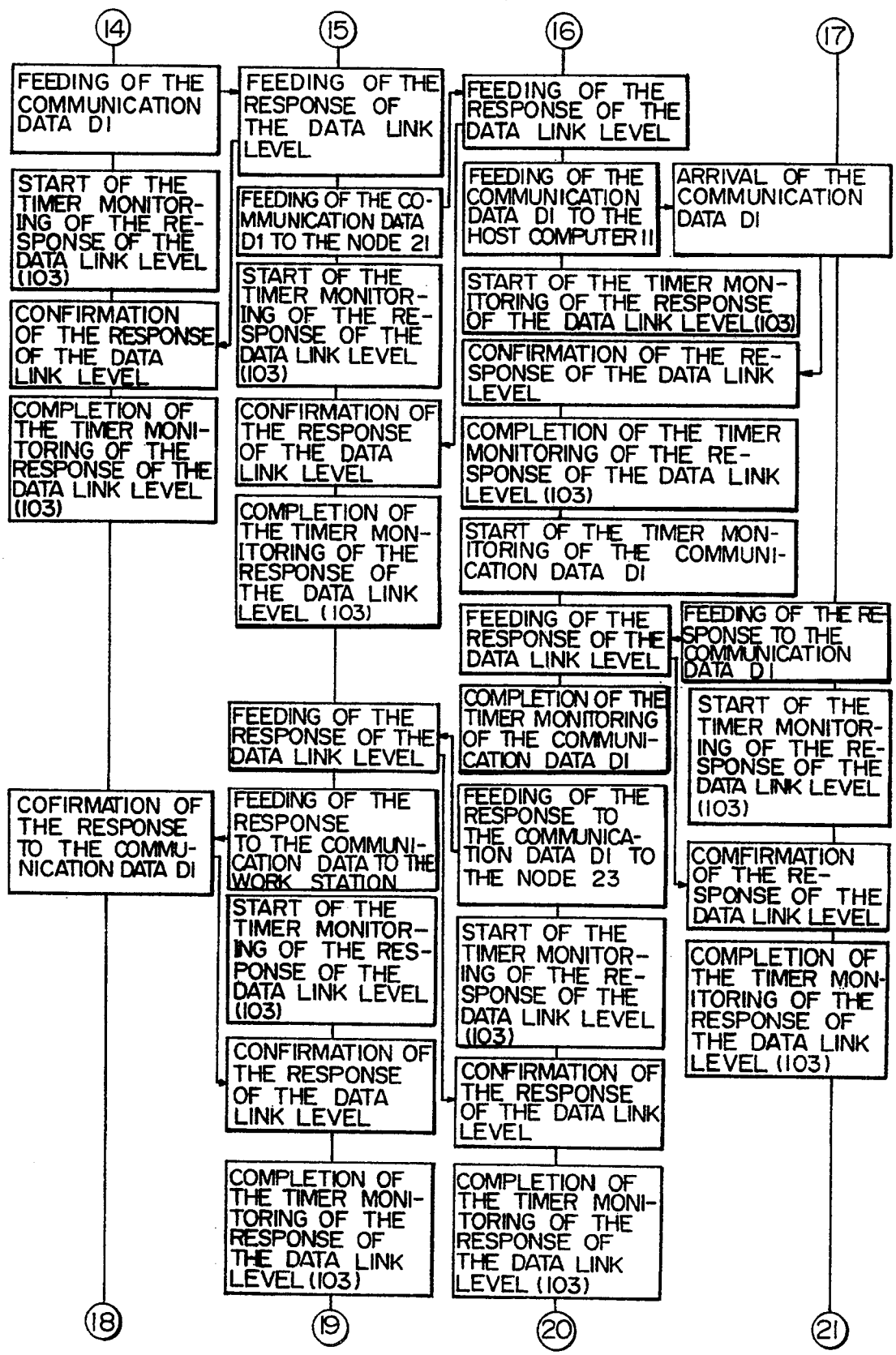
Figure 5C:
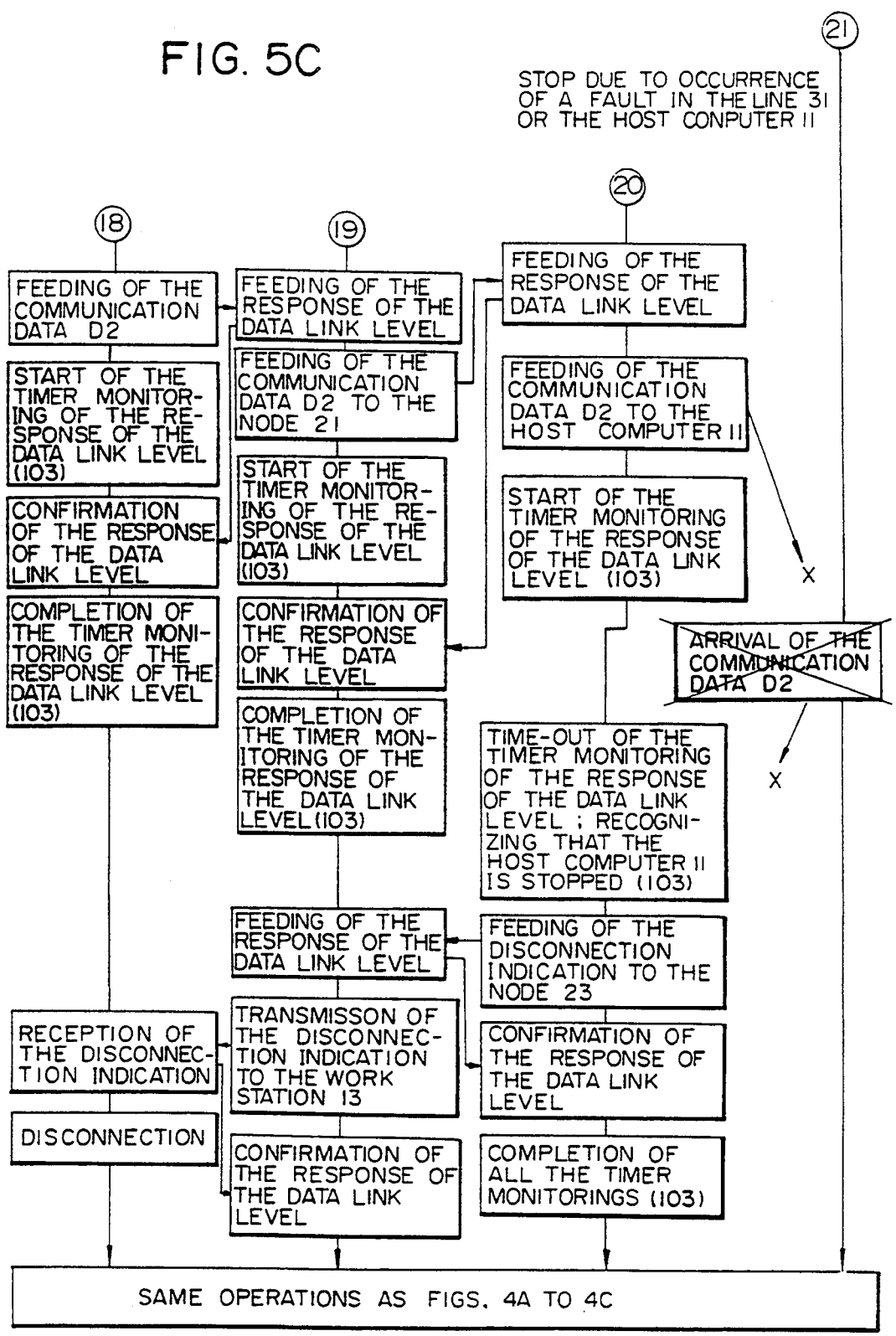

FIG. 3A is a flow chart showing the operation of the normal call setup (setting a call) with respect to the work station 13 and the host computer 11. FIGS. 3B and 3C are respectively flow charts showing the operation of the normal communication between the work station 13 and the host computer 11. FIG. 3D is a flow chart showing the operation of the normal call releasing with respect to the work station 13 and the host computer 11. Moreover, FIGS. 4A through 4C are respectively flow charts showing the operation of automatically switching the center in the case where the host computer 11 is already stopped due to the fault, the scheduled stop or the like (before the call setup). FIGS. 5A through 5C are respectively flow charts showing the operation of the center automatic switching in the case where the fault occurs in the host computer 11 during the communication and the host computer 11 is stopped (after the call setup).

In the present embodiment, normally, the work station 13 communicates with the host computer 11.

First, the description will be given with respect to the operation of the setting a call in the normal state on referring to FIG. 3A.

First, when an operator designates the host computer 11 as a computer to perform the communication, the work station 13 feeds a call request for an address (DTEA 11) of the host computer 11 requiring the communication to the node 23. At this time, the timer monitoring of the response at a level of the data link is started to detected a fault. In order for the node 23 to provide that the request is normally received, after the node 23 has returned the response at a level of the data link to the work station 13, it informs the node 21 of the call request to start the time monitoring of the response of the data link level. On the other hand, the work station 13 confirms the response of the data link level and then completes the timer monitoring of the response of the data link level.

In order for the node 21 to provide that the call request is normally received, after the node 21 has returned the response of the data link level to the node 23, it feeds the information from the node 23 as an incoming call for the host computer 11 to start the timer monitoring of the response of the data link level. The node 23 confirms the response of the data link level to complete the timer monitoring of the response of the data link level. The host computer 11 returns the response of the data link level to the node 21 in response to the incoming call. The node 21 confirms the response of the data link level to complete the timer monitoring of the response of the data link level to start the timer monitoring of the accept of the incoming call from the host computer 11.

The host computer 11 feeds a message corresponding to the call accept to the node 21 to start the timer monitoring of the response of the data link level. Then, the node 21 returns the response of the data link level to the host computer 11 to complete the timer monitoring of the call accept. The host computer 11 confirms the response of the data link level to complete the timer monitoring of the response of the data link level. The node 21 informs the node 23 of the call accept to start the timer monitoring of the response of the data link level.

After the node 23 has returned the response of the data link level to the node 21, it feeds the message indicating completion of the connection from the node 21 to the work station 13 to start the timer monitoring of the response of the data link level. After the node 21 has confirmed the response of the data link level, it completes the timer monitoring of the response of the data link level. Then, the work station 13 returns the response of the data link level to the node 23. After the node 23 has confirmed the response of the data link level, it completes the timer monitoring of the response of the data link level.

By the above series of operations, the call setup is completed. Then, the communication, i.e., the exchange of a telegraphic message between the host computer 11 and the work station 13 is started. By the telegraphic message, it means the communication data D1 and D2, and the responses thereof.

The description will subsequently be given with respect to the operation during the normal communication on referring to FIGS. 3B and 3C.

The work station 13 feeds the communication data D1 to the node 23 to start the timer monitoring of the response of the data link level. After the node 23 has returned the response of the data link level to the work station 13, it feeds the communication data D1 to the node 21 to start the timer monitoring of the response of the data link level. After the work station 13 has confirmed the response of the data link level, it completes the timer monitoring the response of the data link level.

After the node 21 has returned the response of the data link level to the node 23, it feeds the communication data D1 to the host computer 11 to start the timer monitoring of the response of the data link level. The host computer 11 receives the communication data D1 to return the response of the data link level to the node 21. After the node 21 has confirmed the response of the data link level, it completes the timer monitoring of the response of the data link level to start the timer monitoring of the response to the communication data D1.

After the host computer 11 has received the communication data D1 from the node 21, it feeds the response to the communication data D1 to the node 21 to start the timer monitoring of the response of the data link level to complete the timer monitoring of the response to the communication data D1. After the host computer 11 has confirmed the response of the data link level, it completes the timer monitoring of the response of the data link level. The node 21 feeds the response to the communication data D1 to the node 23 to start the timer monitoring of the response of the data link level.

After the node 23 has returned the response of the data link level to the node 21, it feeds the response to the above communication data D1 to the work station 13 to start the timer monitoring of the response of the data link level. After the node 21 has confirmed the response of the data link level, it completes the timer monitoring of the response of the data link level. The work station 13 returns the response of the data link level to the node 23. The node 23 confirms the response of the data link level and then completes the timer monitoring of the response of the data link level.

Moreover, the work station 13 confirms that the host computer 11 has normally received the communication data D1. Thereafter, the communication data D2 is transmitted in the same manner as in the above communication data D1.

The description will subsequently be given with respect to the operation of releasing a call in a normal state on referring to FIG. 3D.

The work station 13 feeds a clear request to the node 23 to start the timer monitoring of the response of the data link level. After the node 23 has returned the response of the data link level to the work station 13, it informs the node 21 of the clear request to start the timer monitoring of the response of the data link level. After the work station 13 has confirmed the response of the data link level, it completes the timer monitoring of the response of the data link level. After the node 21 has returned the response of the data link level to the node 23, it feeds the information from the node 23 as a disconnection indication to the host computer 11 to start the timer monitoring of the response of the data link level.

On the other hand, after the node 23 has confirmed the response of the data link level, it completes the timer monitoring of the response of the data link level. In response to the disconnection indication, the host computer 11 returns the response of the data link level to the node 21. The node 21 confirms the response of the data link level and then completes the timer monitoring of the response of the data link level to start the timer monitoring of disconnection confirmation. The host computer 11 feeds the disconnection confirmation to the node 21 to start the timer monitoring of the response of the data link level.

After the node 21 has returned the response of the data link level to the host computer 11, it completes the timer monitoring of the disconnection confirmation. The host computer 11 confirms the response of the data link level and then completes the timer monitoring of the response of the data link level. The node 21 informs the node 23 of the disconnection confirmation to start the timer monitoring of the response of the data link level. After the node 23 has returned the response of the data link level to the node 21, it feeds the information from the node 21 as the clear confirmation to the work station 13 to start the timer monitoring of the response of the data link level.

The node 21 confirms the response of the data link level and then completes the timer monitoring of the response of the data link level. The work station 13 returns the response of the data link level to the node 23. The node 23 confirms the response of the data link level and then completes the timer monitoring of the response of the data link level. Thus, the operation of releasing a call is performed.

Next, the description will be given with respect to the operation of automatically switching a center in the case where the host computer 11 is already stopped due to the fault, the scheduled stop or the like, on referring to FIG. 4A.

When the communication occurs, the work station 13 feeds a call request to the node 23 and also starts the timer monitoring of the response of the data link level. After the node 23 has returned the response of the data link level to the work station 13, it informs the node 21 of the call request to start the timer monitoring of the response of the data link level. The work station 13 confirms the response of the data link level and then completes the timer monitoring of the response of the data link level.

After the node 21 has returned the response of the data link level to the node 23, it feeds the above call request as an incoming call from the node 23 to the host computer 11 to start the timer monitoring of the response of the data link level. Thus, since the host computer 11 is at stop due to the fault, the scheduled stop or the like, it cannot return the response of the data link level to the node 21. As a result, a time out state to the response of the data link level which is being monitored with the timer is generated in the node 21.

With this as a turning point, the node 21 resets the address of the center or the host computer provided therein to the address (DTEA 12) of the host computer 12 (by the above call redirection section 101) and informs the node 22 of that the work station 13 is at a call request. Then, the node 21 starts the timer monitoring of the response of the data link level. At this time, the node 21 also informs the node 22 that the call redirection is being executed (by the above switching information section 102).

After the node 22 has returned the response of the data link level to the node 21, it feeds the information from the node 23 as an incoming call therefrom to the host computer 12 to start the timer monitoring of the response of the data link level. The node 21 confirms the response of the data link level and then completes the timer monitoring of the response of the data link level. In response to the incoming call, the host computer 12 returns the response of the data link level to the node 22. The node 22 confirms the response of the data link level and then completes the timer monitoring of the response of the data link level to start the timer monitoring of the call accept.

The host computer 12 feeds the message corresponding to the call accept to the node 22 to start the timer monitoring of the response of the data link level. The node 22 returns the response of the data link level to the host computer 12 to complete the timer monitoring of the call accept. The host computer 12 confirms the response of the data link level and then completes the timer monitoring of the response of the data link level. Subsequently, after the node 22 has informed the node 23 of the call accept, it starts the timer monitoring of the response of the data link level. Further, at this time, the node 22 feeds called line address modification information, which is information indicating that the switching to the center or the host computer provided therein was performed. (It means herein information indicating that the address of the host computer to be used is modified from DTEA 11 to DTEA 12), to both the nodes 23 and 21. On receiving this information, the node 21 completes all the timer monitorings.

On the other hand, after the node 21 has returned the response of the data link level to the node 22, it feeds the information including the called line address modification information in the form of a message corresponding to completion of the connection to the work station 13 to start the timer monitoring of the response of the data link level. The node 22 confirms the response of the data link level and then completes the timer monitoring of the response of the data link level. The work station 13 returns the response of the data link level to the node 22. The node 23 confirms the response of the data link level and then completes the timer monitoring of the response of the data link level.

As a result, a call is set between the host computer 12 and the work station 13 and the center automatic switching is achieved, moreover, on receiving the above called line address modification information, the work station 13 automatically confirms that the center or the host computer provided therein is switched from the host computer 11 to the host computer 12, and then changes the address in the memory 130 corresponding to the call for the computer 11 from DTEA 11 to DTEA 12.

Incidentally, instead of the called line address modification information, the node 21 may output the information indicating that the computer 11 is at fault or stop, or the communication with the computer 11 is impracticable. In response to that information. The work station 13 may rewrite the address of the memory 130. This conforms to subsequent embodiments.

The operation as described above is an operation of responding to the first call in the case where the center automatic switching is performed in the communication between the host computer 11 and the work station 13 and the host computer to be used is switched from the host computer 11 to the host computer 12. In the operation after the second call, the work station 13 automatically recognizes by the called line address modification information that the address corresponding to the call for the host computer 11 is changed to the address of the host computer 12 (DTEA 12). Therefore, the work station 13 directly sets a call between that work station and the host computer 12 to start the communication. That is, thereafter, when an operator designates the host computer 11 as a computer to perform the communication, the work station 13 will issue a call request to the host computer 12. The address to be used is switched from the address of the host computer 11 (DTEA 11) to that of the host computer 12 (DTEA 12), so that the node 23 can be directly connected to the node 22 to which the host computer 12 is connected. As a result, the activity efficiency of the resource and the routing efficiency are improved as compared with the case where the telecommunication line is made up via the node 21. Then, in the case where the work station 13 intends to start the communication with the host computer 12 (i.e., when the node 23 receives DTEA 12), the node 23 has a function of selecting the shortest route out of the routes registrated in advance. In the present embodiment, without via the node 21, the node 22 and the node 23 to which the host computer 12 is connected and which is adjacent to the node 22 are directly connected to make up the shortest route.

The function of selecting the shortest route is included in the exchange section 100 of the node 23. Incidentally, instead of the selection of the shortest route, the node 23 may communicate with the computer 12 via the node 21.

Moreover, the timing is as follows when the operation is returned from the state in which the center automatic switching is being performed in the work station, i.e., the state in which the work station 13 recognizes by the called line address modification information that the address (DTEA 11) of the host computer 11 is changed to the address (DTEA 12) of the host computer 12, to the preceding state, i.e., the state in which the work station 13 recognized by the called line address modification information that the address of the host computer to be used is the address (DTEA 11) of the host computer 11. That is, the reset timing of the memory 130 is at a point of time when the power source of the terminal device 13 such as a work station or a personal computer is turned off, or the data of the clock included in that terminal device is updated. At this time, the address in the memory 130 corresponding to a call for the host computer 11 is automatically returned from DTEA 12 to DTEA 11. Moreover, in the case where the center automatic switching due to the scheduled stop of the host computer is performed, the reset of the address in the memory 13 (switching from DTEA 12 to DTEA 11) may be performed at a point of .time when the terminal device 13 receives the information from the host computer 11 or the host computer 12 indicating that the host computer 11 can perform the communication.

On the other hand, the operation of releasing a call is shown in FIG. 4C. After the work station 13 has fed a clear request to the node 23, it starts the timer monitoring of the response of the data link level. The node 23 returns the response of the data link level to the work station 13 and then informs the node 22 of the clear request to start the timer monitoring of the response of the data link level. The work station 13 confirms the response of the data link level and then completes the timer monitoring of the response of the data link level.

After the node 23 has returned the response of the data link level to the node 23, it feeds the information from the node 23 as a disconnection indication to the host computer 12 to start the timer monitoring of the response of the data link level. The node 23 confirms the response of the data link level and then completes the timer monitoring of the response of the data link level. The host computer 12 feeds the response of the data link level to the node 22. The node 22 confirms the response of the data link level and then completes the timer monitoring of the data link level to start the timer monitoring of the disconnection confirmation.

The host computer 12 feeds a message corresponding to the disconnection confirmation to the node 22 to start the timer monitoring of the response of the data link level. After the node 22 has returned the response of the data link level to the host computer 12, it completes the timer monitoring of the disconnection confirmation. The host computer 12 confirms the response of the data link level and then completes the timer monitoring of the response of the data link level. The node 22 informs the node 23 of the disconnection confirmation to start the timer monitoring of the response of the data link level. After the node 23 has returned the response of the data link level to the node 22, it feeds the information from the node 22 as a clear confirmation to the work station 13 to start the timer monitoring of the response of the data link level.

The node 22 confirms the response of the data link level and then completes the timer monitoring of the response of the data link level. The work station 13 returns the response of the data link level to the node 23. As a result, the node 23 completes the timer monitoring of the response of the data link level. By the above series of operations, the release of a call is completed.

Next, the description will be given to the operation in the center automatic switching during the communication, i.e., in a state in which a telegraphic message is exchanged between the host computer 11 and the work station 13, on referring to FIGS. 5A through 5C. Incidentally, by the telegraphic message, it means the communication data D1 and D2, and the responses thereof.

The work station 13 feeds a call request to the node 23 using the address (DTEA 11) of the host computer 11 to start the timer monitoring of the response of the data link level. After the node 23 has returned the response of the data link level to the work station 13, it informs the node 21 of the call request to start the timer monitoring of the response of the data link level. In the mean time, the work station 13 confirms the response of the data link level and then completes the timer monitoring of the response of the data link level.

After the node 21 has returned the response of the data link level to the node 23, it feeds the information from the node 23 as an incoming call to the host computer 11 to start the timer monitoring of the response of the data link level. The node 23 confirms the response of the data link level and then completes the timer monitoring of the response of the data link level. The host computer 11 returns the response of the data link level to the above incoming call to the node 21. The node 21 confirms the response of the data link level and then completes the timer monitoring of the response of the data link level to start the timer monitoring of the call accept from the host computer 11.

The host computer 11 feeds a massage corresponding to the call accept to the node 21 to start the timer monitoring of the response of the data link level. The node 21 returns the response of the data link level to the host computer 11 to complete the timer monitoring of the call accept. The host computer 11 confirms the response of the data link level and then completes the timer monitoring of the response of the data link level. The node 21 informs the node 23 of the call accept to start the timer monitoring of the response of the data link level.

After the node 23 has returned the response of the data link level to the node 21, it feeds the information from the node 21 as a message corresponding to completion of the connection to the work station 13 to start the timer monitoring of the response of the data link level. The node 21 confirms the response of the data link level and then completes the timer monitoring of the response of the data link level. The work station 13 returns the response of the data link level to the node 23. The node 23 confirms the response of the data link level and then completes the timer monitoring of the response of the data link level.

By the above series of operations, the call setup is completed between the work station 13 and the host computer 11 and the communication, i.e., the state in which a telegraphic message is exchanged between the host computer 11 and the work station 13 is started. By the telegraphic message, as described above, it means the communication data D1 and D2, and the responses thereof.

In the communication, first, the work station 13 feeds the communication data D1 to the node 23 to start the timer monitoring of the response of the data link level. After the node 23 has returned the response of the data link level to the work station 13, it feeds the above communication data D1 to the node 21 to start the timer monitoring of the data link level. The work station 13 confirms the response of the data link level and then completes the timer monitoring of the data link level.

After the node 21 has returned the response of the data link level to the node 23, it feeds the above communication data D1 to the host computer 11 to start the timer monitoring of the response of the data link level. The node 23 confirms the response of the data link level and then completes the timer monitoring of the response of the data link level. The host computer 11 receives the above communication data D1 to return the response of the data link level to the node 21. The node 21 confirms the response of the data link level and then completes the timer monitoring of the response of the data link level to start the timer monitoring of the response to the communication data D1.

The host computer 11 feeds the response to the communication data D1 to the node 21 thereby to start the timer monitoring of the response of the data link level. The node 21 returns the response of the data link level to the host computer 11 to complete the timer monitoring of the response to the communication data D1. Then, the node 21 feeds the response to the communication data D1 to the node 23 to start the timer monitoring of the response of the data link level.

The host computer 11 confirms the response of the data link level and then completes the timer monitoring of the response of the data link level. After the node 23 has returned the response of the data link level to the node 21, it feeds the response to the communication data D1 to the work station 13 to start the timer monitoring of the response of the data link level. The node 21 confirms the response of the data link level and then completes the timer monitoring of the response of the data link level. The work station 13 receives the response to the communication data D1 to return the response of the data link level to the node 23. The node 23 confirms the response of the data link level and then completes the timer monitoring of the response of the data link level.

Subsequently, the work station 13 feeds the communication data D2 to the node 23 to start the timer monitoring of the response of the data link level. After the node 23 has returned the response of the data link level to the work station 13, it feeds the above communication data D2 to the node 21 to start the timer monitoring of the response of the data link level. The work station 13 confirms the response of the data link level and then completes the timer monitoring of the response of the data link level. After the node 21 has returned the response of the data link level to the node 23, it feeds the above communication data D2 to the host computer 11 to start the timer monitoring of the response of the data link level.

Then, it is assumed that a fault occurs in the line 31 or the host computer 11. In this case, the communication data D2 does not reach the host computer 11. Alternatively, there occurs an accident in which the response of the data link level to the communication data D2 does not reach the node 21. At this time, in the node 21, there occurs a time out state to the response of the data link level which is being monitored with the timer. With this as a turning point, the node 21 recognizes the fault of the host computer 11. Then, the node 21 informs the node 23 of the disconnection indication.

After the node 23 has returned the response of the data link level to the node 21, it feeds the disconnection indication to the work station 13. The node 21 confirms the response of the data link level and then completes all the timer monitorings. The work station 13 is informed of the disconnection indication to return the response of the data link level to the node 23. Then, the node 23 confirms the response of the data link level to complete the timer monitoring of the response of the data link level.

Then, the call between the host computer 11 and the work station 13 is released. That is, in the work station 13, the communication with the host computer 11 is in a cut off state, i.e., in the disconnection state. However, if the call is again issued from the work station 13, by performing the operation shown in FIGS. 4A through 4C, the host computer of interest is automatically switched to the host computer 12 to perform the call setup, thereby to execute the center automatic switching.

According to the above embodiment, in the fault or stop of the center or the host computer provided therein, it is possible to perform the automatic switching to another center or another host computer provided therein which is free from a fault or the like.

Figure 6:
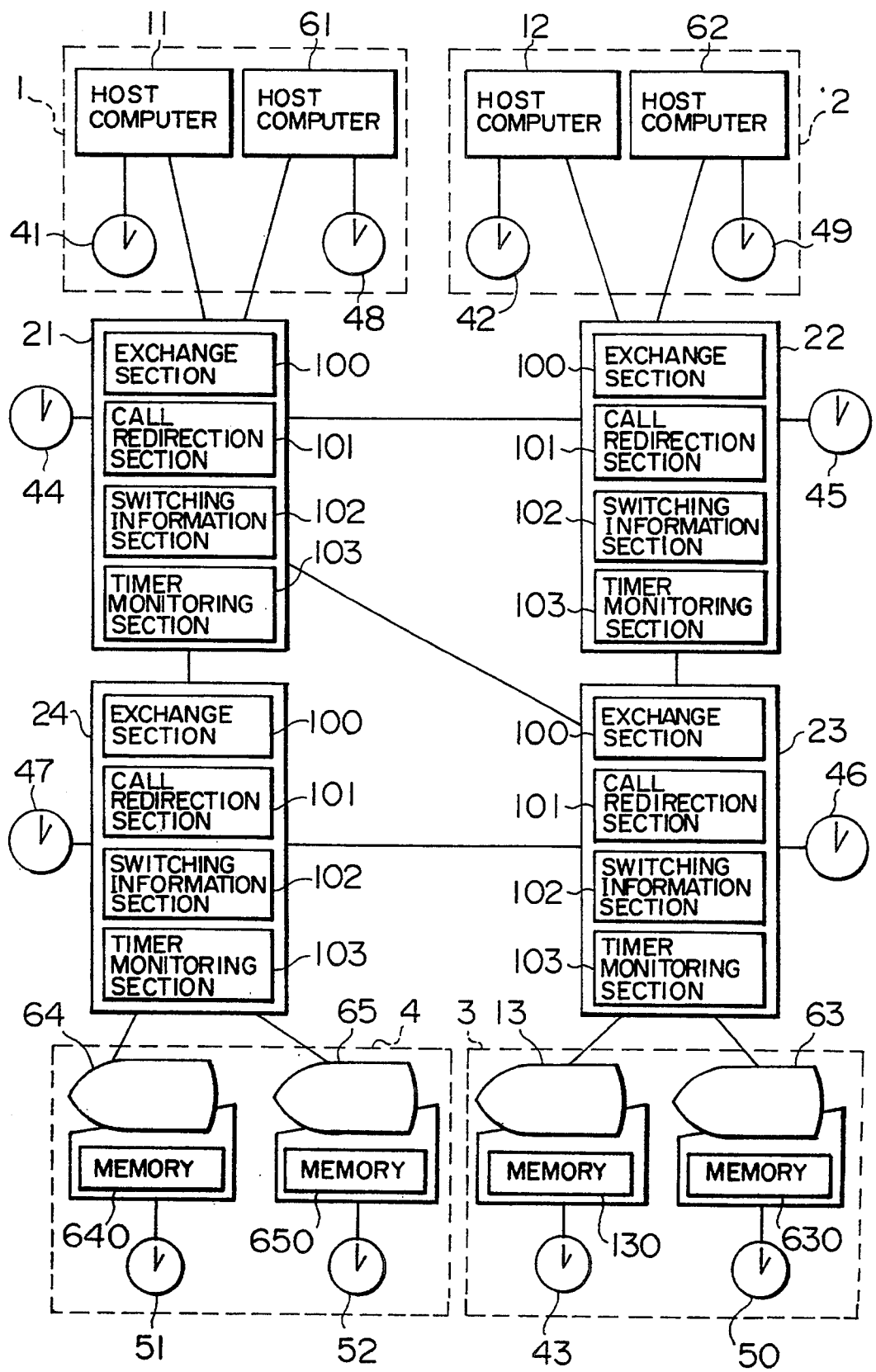
FIG. 6 is a block diagram showing the arrangement of another example of the network system according to the present invention.

Incidentally, in the above-mentioned embodiment, there has been shown an example wherein to each of the nodes is connected one center or one business shop, and each of the centers has one host computer and each of business shops has one work station. However, the automatic switching method according to the present invention is not limited to such an arrangement. That is, for example, as shown in FIG. 6, such as arrangement may be designed as the second embodiment that each of centers (1, 2) or each of business shops (3, 4) has a plurality of host computers (11, 61; 12, 62) or a plurality of work stations (64, 65; 13, 63). Moreover, the lines connecting to the associated nodes to each other may be also arbitrarily arranged.

Incidentally, in FIG. 6, the reference numerals 47, and 48 and 49, and 50, 51 and 52 designate timers included in a node 24, and host computers 61 and 62, and work stations 63, 64 and 65, respectively, and the reference numerals 630, 640 and 650 designate memories included in the work stations 63, 64 and 65, respectively. In the present embodiment, for example, in the case where the work station 13 communicates with the center 1, the work station 13 communicates with the computer 11 in a normal operation, and on occurrence of a fault or stop in the host computer 11, it communicates with the backup computer 61 for example. However, when a fault or stop occurs in the host computer 11, the node 21 detects such a fault or stop to inform the work station 13 of the called line address modification information through the node 23. Then, the work station 13 changes the address of the memory 130 corresponding to a call for the computer 11 from the address DTEA 11 of the computer 11 to DTEA 61 of the computer 61. Accordingly, thereafter, in the work station 13, for the call for the computer 11, the call request is automatically transmitted to the computer 61.

Moreover, in the case where a fault or stop occurs in the host computer 11, the work station 13 may communicate with the computer, e.g., the computer 12 of another center 2. In this case, by the called line address modification information from the node 22, the address of the memory 130 corresponding to a call for the computer 11 is changed from DTEA 11 to DTEA 12. Accordingly, thereafter, in the work station 13, the call request for the call for the computer 11 is automatically transmitted to the computer 12 through the nodes 23 and 22.

Similarly, in the case where the work station 64 installed in the business shop 4 communicates with the computer 11, on occurrence of a fault or stop in the computer 11, by the called line address modification information, the address of the memory 640 corresponding to the call for the computer 11 is changed from DTEA 11 to DTEA 61. On the other hand, in the case where when a fault or stop occurs in the computer 11, a computer to be used is switched from the computer 11 to the computer 12, by the called line address modification information from the node 22, the address of the memory 64 corresponding to the call for the computer 11 is changed from DTEA 11 to DTEA 12. Accordingly, thereafter, the call request for the call for the computer 11 in the work station 64 is automatically transmitted to the computer 61 (or to the computer 12 through the nodes 24 and 21, or to the computer 12 through the nodes 24, 23 and 22). Incidentally, in the case where the computer 12 is used as a back up computer for the computer 11, if a line is directly provided between the nodes 24 and 22, the call request for the computer 11 in the work station 64 may be directly transmitted to the node 22 through node 24.

Incidentally, in the case where a fault or stop occurs in the computer 11, such an arrangement may be designed that all the work stations 13, and 63 through 65 are informed of the called line address modification information and the address of each of the memories 130, 630, 640 and 650 corresponding to the call for the computer 11 is changed from DTEA 11 to DTEA 61 (or DTEA 12).

Figure 7:
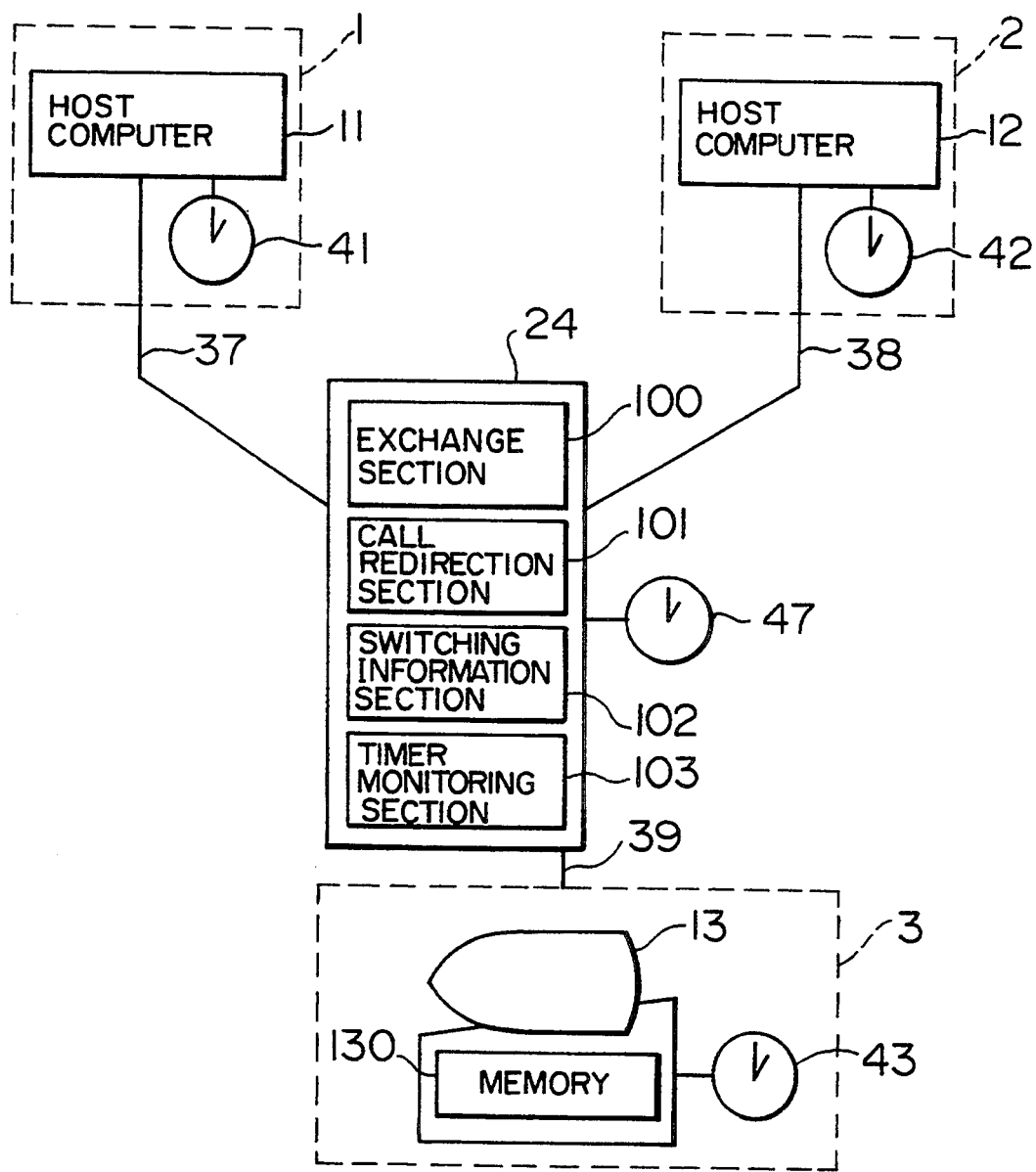
FIG. 7 is a block diagram showing the arrangement of still another example of the network system according to the present invention.
Figure 8:
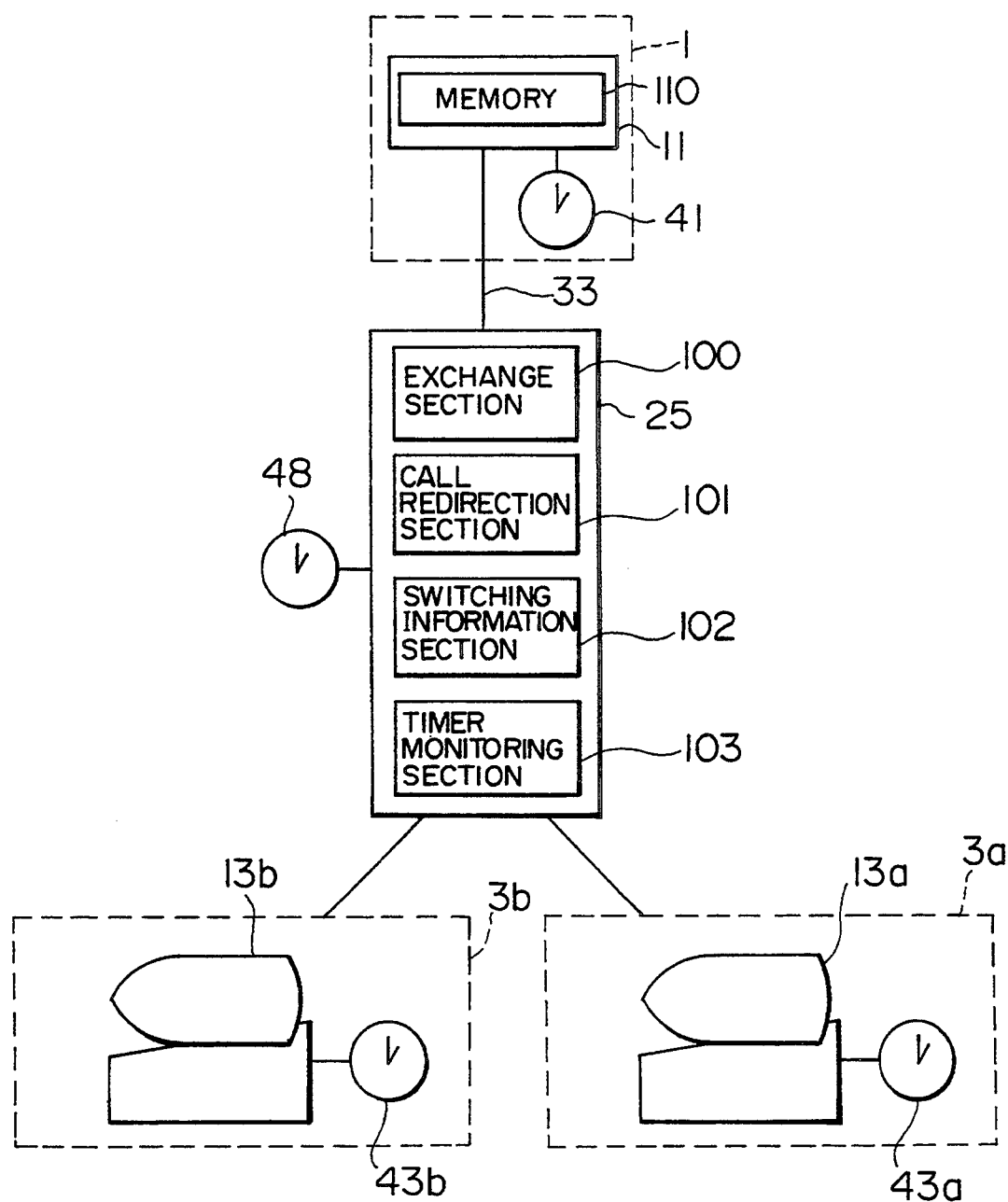
FIG. 8 is a block diagram showing the arrangement of yet another example of the network system according to the present invention.

FIG. 7 is a block diagram showing the arrangement of the third embodiment of the present invention. The present embodiment is arranged in such a way that only one node 24 is provided between the business shop 3 and the centers 1, 2. In the present embodiment, for the call request issued from the work station 13 to the computer 11, when the node 24 detects the fault or stop of the computer 11, the node 24 transmits the call to the backup computer 12 by the call redirection section 101 to start the timer monitoring of the response of the data link level. In response to the incoming call, the host computer 12 returns the response of the data link level to the node 24. The node 24 confirms the response of the data link level and then completes the timer monitoring of the response of the data link level to start the timer monitoring of the call accept.

The host computer 12 feeds a message corresponding to the call accept to the node 24 to start the timer monitoring of the response of the data link level. The node 24 returns the response of the data link level to the host computer 12 to complete the timer monitoring of the call accept. After the host computer 12 has confirmed the response of the data link level, it completes the timer monitoring of the response of the data link level. Subsequently, the node 24 feeds the called line address modification information (in this case, the information indicating that the address corresponding to the call for the host computer 11 is changed from DTEA 11 to DTEA 12) as the information indicating that the switching to another host computer has been performed, in the form of information indicating completion of the connection, to the work station 13.

As a result, a call is set between the host computer 12 and the work station 13 to achieve the center automatic switching. Therefore, the data communication is performed between the work station 13 and the computer 12. For the subsequent calls for the host computer 11, the call request is automatically transmitted to the computer 12 using the address DTEA 12 of the host computer 12 stored in the memory of the work station 13.

FIG. 6 is a block diagram showing the arrangement of the fourth embodiment of the present invention. The present embodiment is an example wherein a call is issued from the center 1 to each of a plurality of business shops 3a and 3b. In this example, a memory 110 for storing addresses DTEA 3a and DTEA 3b of the work stations 13a and 13b in the business shops 3a and 3b is provided in the host computer 11. In this example, for example, in a normal state, the work station 3a and the host computer 11 communicate with each other. Now, when a fault or stop occurs in the work station 13a during a call is being issued from the computer 11 to the work station 13a, the call request is fed to the backup work station 13b. In response to a message corresponding to the call accept from the work station 13b, the node 25 feeds the called line address modification information to the computer 11. In response to that information, the computer 11 changes the address corresponding to the call for the work station 3a from DTEA 3a to DTEA 3b. Accordingly, thereafter, for the call for the work station 3a, the node 25 automatically transmits the call request to the work station 13b.

In the present embodiment as well in the same manner as in the first and second embodiments, such an arrangement may be designed that the center and the business shop communicate with each other through a plurality of nodes, or a plurality of work stations are provided in one business shop, or a plurality of host computers are provided in one center.

Moreover, such an arrangement may be also designed that by combining the first through third embodiments and the fourth embodiment, the address modification function is provided in both the center and the business shop to perform the automatic switching of the computer in the center and the automatic switching of the work station in the business shop.

The fifth embodiment of the present invention will subsequently be described. The present embodiment is arranged in such a way that as means for detecting automatically a fault or scheduled stop of the host computer in the center, a plurality of lines are provided between the node and the host computer.

Figure 9:
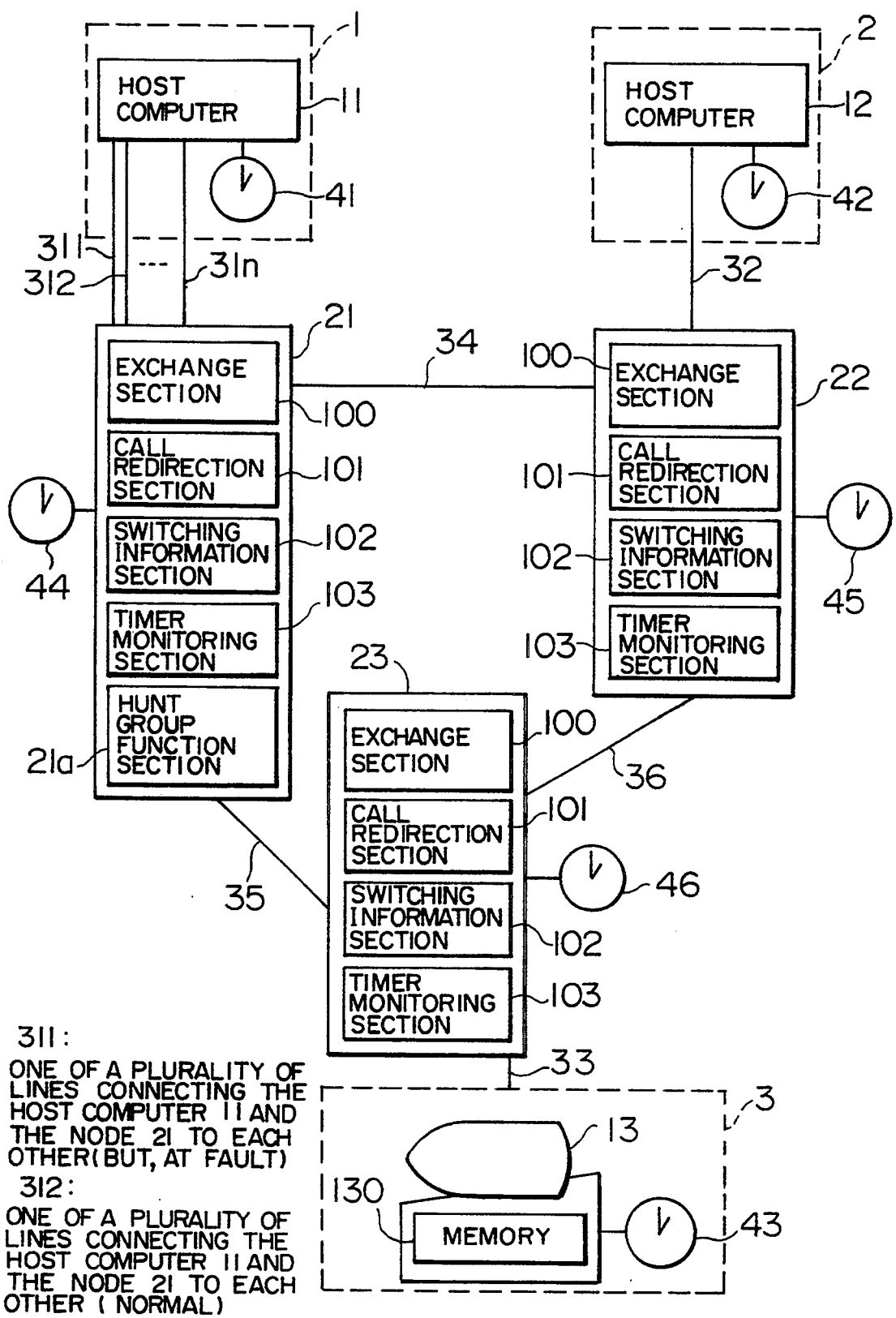
FIG. 9 is a block diagram showing the arrangement of a further example of the network system according to the present invention.

FIG. 9 is a block diagram showing the arrangement of an example of the present embodiment. The present example is arranged in such a way that the host computer 11 and the node 21 are connected to each other by a plurality of lines, and a hunt group function section 21a is provided in the node 21. By the hunt group function, it means that when a plurality of lines are provided between a host computer and a node, the plurality of lines are made to correspond to one address. More specifically, the hunt group function is a function wherein in the case where by using the plurality of lines between the host computer 11 and the node 21, the call setup is performed to the host computer 11 by the work station 13, the call setup is performed in the work station 13 using one group address, instead of individual addresses corresponding to the plurality of lines. Thus, it is the same function as in the group telephone in a telephone.

In the case where the host computer 11 is normally operated, and one line connecting the host computer 11 and the node 21 to each other is at fault but at least one normal line is still present, by using this hung group function, a call can be made to reach the host computer 11, without the computer 11 being switched to the host computer 12.

More specifically, by using the present function, the work station 13 can be operated as if it is connected to the host computer through one line, without being sware of the provision of the plurality of lines. The operation of the present embodiment will hereinbelow be concretely described.

For example, in the arrangement shown in FIG. 9, in the case where out of n lines 31*1* through 31*n* between the host computer 11 and the node 21, one line is at fault, by the hunt group function of the node 21, the work station 13 does not need to especially be aware of the line trouble. Moreover, for the call setup request from the work station 13, since the node 21 can carry out the call setup using another line free from a fault, it is judged by the work station 13 that the host computer 11 is not at fault. Now, the method of recognizing the line trouble by the node 21 depends on the time monitoring of the response at a level of the data link, in the same manner as described above.

Moreover, in the case as well where faults occur in a plurality of lines, if only one line free from a fault is still present, it is possible to perform the call setup. Therefore, the host computer is not regarded as at fault or stop by the node 21. However, when only one normal line remains due to the line trouble, the operation may not be continued in a performance aspect in some cases. Therefore, such a technique may be designed that the necessary number of lines is set to the node 21 in advance, and at a point of time when the number of available lines reaches that value, it is determined that the center is at fault. On the other hand, if the host computer 11 is stopped due to the scheduled stop or fault, the node 21 will recognize a state similar to a state in which all the lines are at fault by the timer monitoring of the confirmation of the response of the data link level, and the like. As a result, the node 21 can determine that the host computer 11 is at fault or stop. That is, when in all the lines, the call setup (incoming call) becomes unsuccessful, it is judged that the host computer 11 is at fault or stop, and then the call setup for another host computer 12 is performed.

Figure 10A:
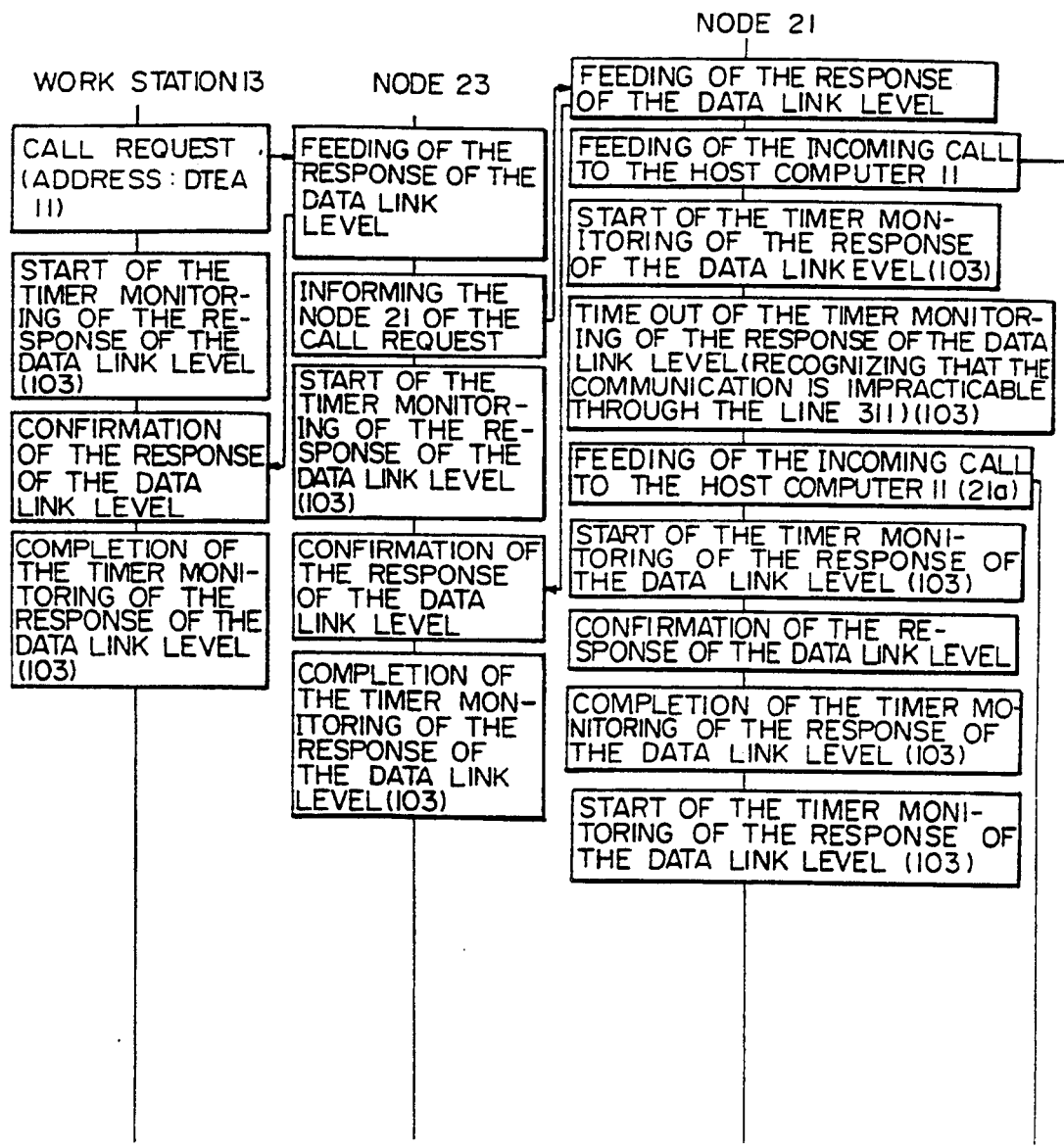
FIGS. 10A and 10B is a flow chart useful in explaining a call setup operation in the example shown in FIG. 9.
Figure 10:
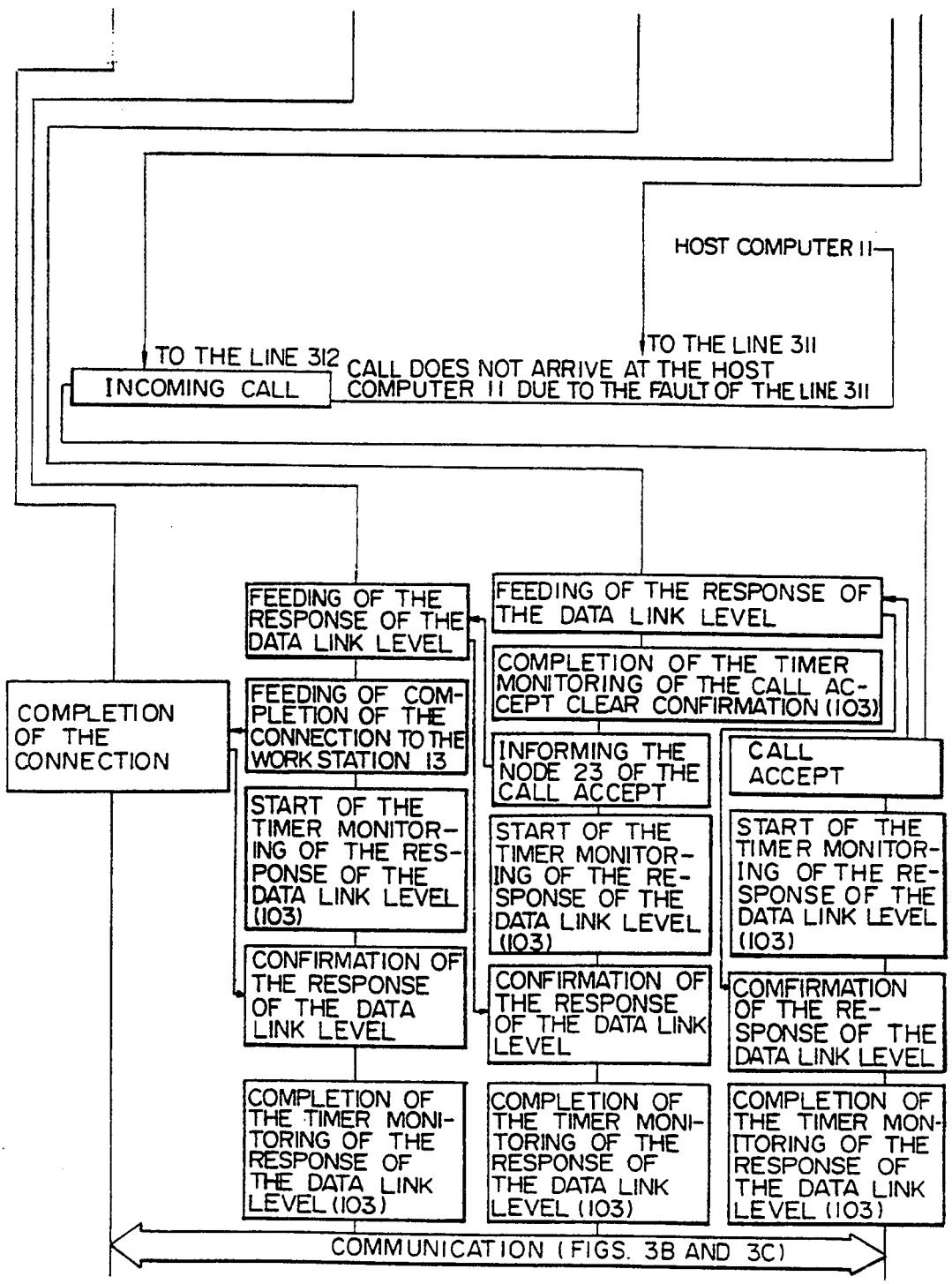

FIGS. 10A and 10B are a flow chart useful in explaining the operation of the embodiment shown in FIG. 9. That is, there is shown a specific operation in which the computer 22 does not receive an incoming call due to a fault of a line 311 and receives an incoming call through a line 312. Other operations except that operation is the same as in the embodiment shown in FIG. 3A, and therefore, the description thereof is omitted here for brevity.

That is, when the work station 13 starts to communicate with the computer 13, the call request from the work station 12 is fed to the node 21 through the node 23.

After the node 21 has returned the response of the data link level to the node 23, it feeds the above call request as an incoming call from the node 23 to the host computer 11 through the line 311 to start the timer monitoring of the response of the data link level. Then, since the line 311 is at fault, the computer 11 cannot return the response of the data link level to the node 21. As a result, in the node 21, there occurs a time out state to the response of the data link level which is being monitored by the timer.

With this as a turning point, the node 21 feeds the call request to the computer 11 through another line 312 by its hunt group function. Then, if the line 312 is free from a fault and the host computer 11 is not at fault or stop, in response to the incoming call, the host computer 11 returns the response of the data link level to the node 21.

Thus, the node 21 and the host computer 11 are connected to each other through the line 312.

Incidentally, such an arrangement may be designed that the node 22 is also provided with the hunt group function and the node 22 and the host computer 12 are connected to each other through a plurality of lines.

Moreover, the present embodiment is applicable to the second through fourth embodiments.

Moreover, it is needless to say that each of the embodiments shows one example of the present invention, and therefore, the present invention is not limited thereto or thereby.

As set forth hereinabove in detail, according to the present invention, in the network system in which a plurality of units are connected to one another through telecommunication lines, it is possible to realize an automatic switching method in which when a fault occurs in an unit, an operator performs an automatic switching to another unit free from a fault or the like (i.e., backup unit) without being aware of such a fault, and an automatic switching unit employing the same.

We claim:

1. A network system in which a plurality of computers and a terminal device are connected to one another through a node by telecommunication lines, and one computer is designated by an address from said terminal device to receive data communication from said terminal device through said node, said node comprising:
    means for detecting a stop or fault of said one computer, or a stop or fault of the telecommunication line connecting said one computer and said node to each other, in response to call for said one computer from said terminal device;
    means for switching said one computer from being designated to receive the data to another computer for receiving the data, in response to the detection of the stop or fault; and
    means for informing said terminal device that the switching to said another computer has been performed,
    said terminal device including means for changing the address of the designated computer from an address of said one computer to an address of said another computer, in response to the information of switching.

2. The network system according to claim 1, wherein said node includes means for performing call setup to the said another computer, in response to the detection of the stop or fault.

3. The network system according to claim 1, wherein said terminal device includes means for issuing a call to said another computer on the basis of the new address through said node, in the case where said one computer is designated as a computer to perform the communication, after the change of the address.

4. The network system according to claim 1, wherein said node further comprises:
    means for detecting a stop or fault of said one computer, or a stop or fault of the telecommunication line connecting said one computer and said node to each other, during the data communication between said terminal device and said one computer through said node; and
    means for outputting a disconnection indication for disconnecting a call from said terminal device to said one computer to said terminal device, in response to the detecting of the stop or fault during the communication.

5. The network system according to claim 1, wherein a telecommunication line connecting said node and said one computer to each other is constructed by a plurality of lines;
    said means for detecting a stop or fault of said node including means for inspecting stops or faults of said plurality of lines connecting said one computer and said node to each other in sequence, in response to a call issued from said terminal device to said one computer; and said information means including means for informing said terminal device of the stops or faults, in response to the detection of all the stops or faults of said plurality of lines.

6. The network system according to claim 5, wherein said node includes means for setting call setup to said one computer through one line of said plurality of lines when said one line is judged to be normal by said inspection means.

7. A network system in which a plurality of computers and a terminal device are connected to one another through a node by telecommunication lines, and one computer is designated by said terminal device to receive data from said terminal device through said node, said node comprising:

means for detecting a stop or fault of said one computer, or a stop or fault of the telecommunication line connecting said one computer and said node to each other, in response to an incoming call for said one computer from said terminal device; and means for switching designation from said one computer to another computer, in response to the detection of the stop or fault comprising means for informing said terminal device that communication is impractical, in response to the detection of the stop or fault;

said terminal device including means for changing an address of the designated computer to perform the communication from an address of said one computer to an address of said another computer, in response to the information that the communication is impractical.

8. A network system in which a plurality of computers and a terminal device are connected to one another through a node by telecommunication lines, and one computer is designated by said terminal device to communicate data from said terminal device through said node, said node comprising:

means for detecting a stop or fault of said one computer, or a stop or fault of the telecommunication line connecting said one computer and said node to each other, in response to an incoming call for said one computer from said terminal device;

means for informing said terminal device of address modification information, in response to the detection of the stop or fault; and means for switching designation from said one computer to another computer, in response to the address modification information, wherein said terminal device includes means for changing an address of the designated computer to perform the communication from an address of said one computer to a new address of another computer, in response to the address modification information.

9. A network system in which a plurality of terminal devices and a computer are connected to one another through a node by telecommunication lines, and one terminal device is designated by said computer to communicate data from said computer to said one terminal device through said node, said node comprising:

means for detecting a stop or fault of said one terminal device, or a stop or fault of the telecommunication line connecting said one terminal device and said node to each other, in response to a call for said one terminal device in response to the designation of said one terminal device by said computer;

means for informing said computer of the stop or fault, in response to the detection of the stop or fault; and means for switching destination from said one computer to another computer, in response to the detection of the stop or fault, wherein said computer includes means for changing an address of the designated terminal device to perform the communication from an address of said one terminal device to an address of another terminal device in response to the information of said stop or fault.

10. The network system according to claim 9, wherein said node includes means for setting call setup said another terminal device, in response to the detection of the stop or fault.

11. The network system according to claim 9 wherein said computer includes means for issuing a call to said another computer on the basis of the new address through said node, in the case where said one terminal device is designated to perform the communication, after the changing of the address.

12. The network system according to claim 9, wherein said node further comprises:

means for detecting a stop or fault of said one terminal device, or a stop or fault of the telecommunication line connecting said one terminal device and said node to each other, during the data communication between said computer and said one terminal device through said node; and means for outputting a disconnection indication for disconnecting a call from said computer to said one terminal device to said computer, in response to the detection of the stop or fault during the communication.

13. The network system according to claim 9, wherein the telecommunication line connecting said node and said one terminal device to each other is constructed by a plurality of lines;

said means for detecting a stop or fault includes means for inspecting stops or faults of said plurality of lines connecting said one terminal device and said node to each other in sequence, in response to a call issued from said computer to said one terminal device;

said information means includes means for informing said computer of the stops or faults, in response to the detection of all the stops or faults of said plurality of lines; and said terminal device includes means for changing an address of the designated computer from an address of said one computer to a new address of said another computer, in response to the information of switching.

14. The network system according to claim 13, wherein said node includes means for setting call setup to said one terminal device through one line of said plurality of lines, when said one line is judged to be normal by said inspection means.

15. A line switching method using a network system in which a plurality of computers and a terminal device are connected to one another through a node by telecommunication lines, and one computer is designated by said terminal device to communicate data from said terminal device through said node, said method comprising the steps by said node of:

detecting a stop or fault of said one computer, or a stop or fault of the telecommunication line connecting said one computer and said node to each other, in response to an incoming call for said one computer from said terminal device; and informing said terminal device of address modification information, in response to the detection of the stop or fault; and changing an address of the designated computer to perform the communicating from an address of said one computer to a new address of another computer, in response to said information of the stop or fault.

16. The line switching method used in a network system according to claim 15, further comprising the step by said node of:

performing call setup in said another computer, in response to the detection of the stop or fault.

17. The line switching method used in a network system according to claim 15, further comprising the step by said terminal device of:

issuing a call to said another computer on the basis of the new address through said node, in the case where said one computer is designated to perform the communicating after the changing of the address.

18. The line switching method used in a network system according to claim 15, further comprising the step by said node of:

detecting a stop or fault of said one computer, or a stop or fault of the telecommunication line connecting said one computer and said node to each other, during the data communication between said terminal device and said one computer through said node; and outputting a disconnection indication for disconnecting a call from said terminal device to said one computer to said terminal device, in response to the detection of the stop or fault during the communication.

19. The line switching method used in a network system according to claim 15, wherein the telecommunication line connecting said node and said one computer to each other is constructed by a plurality of lines;

said step of detecting a stop or fault of said node includes a step of inspecting stops or faults of said plurality of lines connecting said one computer and said node to each other in sequence, in response to a call issued from said terminal device to said one computer; and said information step includes a step of informing said terminal device of the stops or faults, in response to the detection of all the stops or faults of said plurality of lines.

20. The line switching method used in a network system according to claim 19, further comprising the step by said node of;

setting call setup to said one computer through one line of said plurality of lines when said one line is judged to be normal by said inspection step.

21. A line switching method used in a network system in which a plurality of terminal devices and a computer are connected to one another through a node by telecommunication lines, and one terminal device is designated to communicate data from said computer through said node, said method comprising the steps by said node of:

detecting a stop or fault of said one terminal device, or a stop or fault of the telecommunication line connecting said one terminal device and said node to each other, in response to a call issued from said computer to said one terminal;

informing said computer of the stop or fault, in response to the detection of the stop or fault; and changing an address of the designated terminal device to perform the communication from an address of said one terminal device to a new address of another terminal device, in response to the information of the stop or fault.

22. The line switching method used in a network system according to claim 21, further comprising the step by said node of;

setting call setup to another terminal device, in response to the detection of the stop or fault.

23. The line switching method used in a network system according to claim 21, further comprising the step by said computer of;

issuing a call to said another computer on the basis of the new address through said node, in the case where said one terminal device is designated as a terminal device to perform the communication, after the change of the address.

24. A line switching method used in a network system in which a plurality of computers and a terminal device are connected to one another through a node by telecommunication lines, and one computer is designated by said terminal device to communicate data with said terminal device through said node, said method comprising the steps by said node of:

detecting a stop or fault of said one computer, or a stop or fault of the telecommunication line connecting said one computer and said node to each other, in response to an incoming call for said one computer from said terminal device;

setting call setup to another computer, in response to the detection of the stop or fault;

informing said terminal device of the stop or fault, in response to the call setup to said another computer; and changing an address of the designated computer to perform the communication from an address of said one computer to a new address of said another computer, in response to the informing of the stop or fault.

25. The line switching method used in a network system according to claim 24, further comprising the step by said terminal device of:

issuing a call to said another computer on the basis of the new address through said node, in the case where said one computer is designated as a computer to perform the communication, after the changing of the address.

* * * * *

UNITED STATES PATENT AND TRADEMARK OFFICE
CERTIFICATE OF CORRECTION

PATENT NO. : 5,384,783
DATED : January 24, 1995
INVENTOR(S) : Shigeki Satomi, et al.

It is certified that error appears in the above-indentified patent and that said Letters Patent is hereby corrected as shown below:

Claim 1, column 18, line 26, before "call" insert --a--.

Signed and Sealed this

Twenty-first Day of March, 1995

Attest:

BRUCE LEHMAN

*Attesting Officer*   *Commissioner of Patents and Trademarks*